(12) United States Patent
Hayashi et al.

(10) Patent No.: US 8,743,246 B2
(45) Date of Patent: Jun. 3, 2014

(54) COLOR IMAGING DEVICE

(71) Applicant: FUJIFILM Corporation, Tokyo (JP)

(72) Inventors: Kenkichi Hayashi, Saitama (JP); Seiji Tanaka, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/930,965

(22) Filed: Jun. 28, 2013

(65) Prior Publication Data

US 2013/0286262 A1 Oct. 31, 2013

Related U.S. Application Data

(63) Continuation of application No. PCT/JP2012/053775, filed on Feb. 17, 2012.

(30) Foreign Application Priority Data

Feb. 21, 2011 (JP) ................................ 2011-034627
Jul. 25, 2011 (JP) ................................ 2011-162415
Dec. 27, 2011 (JP) ................................ 2011-286005

(51) Int. Cl.
*H04N 3/14* (2006.01)
(52) U.S. Cl.
USPC ........................... 348/272; 348/273; 348/280
(58) Field of Classification Search
CPC ............ H04N 9/045; H04N 2209/045; H04N 2209/046; G06T 4/015
USPC ................... 348/277, 280, 272, 273
See application file for complete search history.

(56) References Cited

U.S. PATENT DOCUMENTS 6,914,628 B1 * 7/2005 Kuwata et al. ................ 348/273
7,123,299 B1 * 10/2006 Yoshida et al. ............... 348/277
(Continued)

FOREIGN PATENT DOCUMENTS

JP 8-23543 A 1/1996
JP 11-285012 A 10/1999
(Continued)

OTHER PUBLICATIONS

International search report issued in PCT/JP2012/053775 mailed Mar. 27, 2012.
Written Opinion of the International Searching Authority issued in PCT/JP2012/053775 mailed Mar. 27, 2012.

*Primary Examiner* — Nhan T Tran
(74) *Attorney, Agent, or Firm* — Birch, Stewart, Kolasch & Birch, LLP

(57) ABSTRACT

A color filter array includes a basic array pattern P1 constituted by a square array pattern corresponding to 3×3 pixels. In the color filter array, basic array pattern P1 is arranged in a horizontal direction and a vertical direction repeatedly. G filters that are brightness system pixels are arranged at the four corners and the center, that is, arranged on the both diagonal lines. The G filters are in each line of horizontal, vertical, and diagonal directions of the color filter array, and the color filter array includes a square array that corresponds to 2×2 pixels that are constituted by the G filters. A ratio of the number of G pixels that help most to obtain a brightness signal of the basic array pattern P1 is greater than each ratio of the number of R pixels and the number of B pixels that correspond to the color other than G.

12 Claims, 18 Drawing Sheets

(56) References Cited

U.S. PATENT DOCUMENTS

| | | |
|---|---|---|
| 7,349,016 B2 * | 3/2008 | Fujii et al. .................... 348/277 |
| 7,548,264 B2 * | 6/2009 | Mitsunaga et al. ........... 348/272 |
| 2002/0149686 A1 | 10/2002 | Taubman |
| 2003/0020819 A1 * | 1/2003 | Fukuda ........................ 348/246 |
| 2011/0279705 A1 * | 11/2011 | Kuang et al. ................. 348/280 |

FOREIGN PATENT DOCUMENTS

| | | |
|---|---|---|
| JP | 2000-308080 A | 11/2000 |
| JP | 2005-136766 A | 5/2005 |
| JP | 2007-306490 A | 11/2007 |
| JP | 2008/066698 A2 | 6/2008 |
| JP | 2010-512048 A | 4/2010 |

* cited by examiner

|  | 1 | 3 | 5 | 7 | 9 | 11 | 13 | 15 |
|---|---|---|---|---|---|---|---|---|
|  | G | G | B | G | G | B | G | G |
|  | R | R | G | R | R | G | R | R |
|  | G | G | B | G | G | B | G | G |

P1

(B)

|  | 1 | 5 | 9 | 13 | 17 | 21 |
|---|---|---|---|---|---|---|
|  | G | B | G | G | B | G |
|  | R | G | R | R | G | R |
|  | G | B | G | G | B | G |

P1

(C)

|  | 1 | 9 | 17 | 25 | 33 | 41 | 49 |
|---|---|---|---|---|---|---|---|
|  | G | G | B | G | G | B | G |
|  | R | R | G | R | R | G | R |
|  | G | G | B | G | G | B | G |

|   | G | B | G | G | R | G |
|---|---|---|---|---|---|---|
| 1 | G | B | G | G | R | G |
| 3 | G | B | G | G | R | G |
| 5 | R | G | R | B | G | B |
| 7 | G | B | G | G | R | G |

A ARRAY — B ARRAY (B)

|   | G | B | G | G | R | G |
|---|---|---|---|---|---|---|
| 1 | G | B | G | G | R | G |
| 5 | R | G | R | B | G | B |
| 9 | G | B | G | G | R | G |

A ARRAY — B ARRAY (C)

|    | G | B | G | G | R | G |
|----|---|---|---|---|---|---|
| 1  | G | B | G | G | R | G |
| 9  | G | B | G | G | R | G |
| 17 | R | G | R | B | G | B |
| 25 | G | B | G | G | R | G |

A ARRAY — B ARRAY

COLOR IMAGING DEVICE

CROSS-REFERENCE TO RELATED APPLICATIONS

This application is a continuation application and claims the priority benefit under 35 U.S.C. §120 of PCT Application No. PCT/JP2012/053775 filed on Feb. 17, 2012 which application designates the U.S., and also claims the priority benefit under 35 U.S.C. §119 of Japanese Patent Applications No. 2011-034627 filed on Feb. 21, 2011, No. 2011-162415 filed on Jul. 25, 2011 and No. 2011-286005 filed on Dec. 27, 2011 which applications are all hereby incorporated by reference in their entireties.

BACKGROUND OF THE INVENTION

1. Technical Field of the Invention

The present invention is related to a color imaging device, and in particular, to a color imaging device that can reduce occurrence of color moire and achieve high resolution.

2. Background Art

Because an output image of a single-panel color imaging device is a RAW image (mosaic image), a multi-channel image is obtained by processing to interpolate a pixel of a missing color from the surrounding pixel (synchronization processing and demosaic processing). In this case, there is a problem of a reproduction characteristic of a high-frequency image signal, and there is an issue in which it is important that high-resolution is achieved by expanding a reproduction band while suppressing occurrence of color moire (false color) because, in the color imaging device, aliasing is easily generated in a captured image as compared with a monochrome imaging device.

In a primary color system Bayer array that is a color array that is widely used in the single-panel color imaging device, because green (G) pixels are arranged in a checkered pattern, and red (R) pixels and blue (B) pixels are arranged line-sequentially, there is a problem of reproduction accuracy when a high frequency signal is generated in the diagonal directions for the G signal and reproduction accuracy when a high frequency signal is generated in the horizontal and vertical directions for the R and B signals.

In a case in which a monochrome vertical stripe pattern (high frequency image) as illustrated in (A) portion of FIG. 22 enters an imaging device of a Bayer array illustrated in (B) portion of FIG. 22, when the entered pattern is allocated to a Bayer color array and compared for each color, as illustrated in (C) to (E) portions of FIG. 22, a color image of R in light flat, a color image of B in dark flat, and a color image of G in light/dark mosaic are generated, and the original monochrome image in which there is no concentration difference (level difference) between R, G, and B becomes in a state of being colored depending on a color array and an input frequency.

Similarly, in a case in which a diagonal monochrome high frequency image as illustrated in (A) portion of FIG. 23 enters an imaging device of a Bayer array illustrated in (B) portion of FIG. 23, when the entered pattern is allocated to a Bayer color array and compared for each color, as illustrated in (C) to (E) portions of FIG. 23, color images of R and B in light flat and a color image of G in dark flat are generated, and when it is assumed that a black value is 0 and a white value is 255, the diagonal monochrome high frequency image becomes in green because only G becomes 255. As described above, in the Bayer array, the diagonal high frequency image cannot be reproduced appropriately.

Generally, in an imaging apparatus that uses a single-panel type color imaging device, an optical low pass filter that is constituted by a birefringence material such as crystal is arranged in the front of the color imaging device, and a high frequency is avoided so as to be optically reduced. However, in this method, coloring by the folding of the high frequency signal can be reduced, but there is a problem that the resolution is reduced due to the adverse effect.

In order to solve such a problem, a color imaging device has been proposed in which a color filter array of the color imaging device is a three-colors random array that satisfies an array restriction condition in which a given focused pixel is adjacent to any of three colors including a color of the focused pixel or the four sides of the focused pixel (PTL 1).

In addition, an image sensor of a color filter array has been proposed that includes a plurality of filters having different spectral sensitivities, and in which a first filter and a second filter out of the filters are alternately arranged in one diagonal direction of a pixel grid of the image sensor in a first certain cycle and are alternately arranged in the other diagonal direction in a second certain cycle (PTL 2).

In addition, a color array has been proposed in which, in a color solid imaging device of three primary colors of R, G, and B, appearance probabilities of R, G, and B are equalized and a given straight line (horizontal, vertical, or diagonal straight line) on an imaging surface passes through all of the colors by arranging sets of 3 pixels in which R, G, and B are horizontally arranged so that the sets are shifted in a zig-zag manner vertically (PTL 3).

In addition, a color imaging device has been proposed in which R and B out of three primary colors of R, G, and B are arranged in the horizontal direction and the vertical direction in every three pixels, and G is arranged between R and B (PTL 4).

CITATION LIST

Patent Literature

PTL 1 Japanese Patent Application Laid-Open No. 2000-308080
PTL 2 Japanese Patent Application Laid-Open No. 2005-136766
PTL 3 Japanese Patent Application Laid-Open No. 11-285012
PTL 4 Japanese Patent Application Laid-Open No. 8-23543

BRIEF SUMMARY OF THE INVENTION

Technical Problem

The color imaging device discussed in PTL 1 has a random filter array, and in the color imaging device, it is necessary that optimization is performed for each random pattern when subsequent synchronization (interpolation) processing is executed, so that there is a problem that the synchronization processing becomes complicated. In addition, the random array is effective in low-frequency color moire, and is not effective in a false color of a high frequency part.

In addition, in the image sensor discussed in PTL 2, the G pixels (brightness pixels) are arranged in the checkered pattern, so that there is a problem that pixel reproduction accuracy in a limit resolution area (particularly, in the diagonal directions) is not excellent.

In the color solid imaging device discussed in PTL 3, there is an advantage that occurrence of a false color can be suppressed because filters for all of the colors exist on the given straight line, however, there is a problem that the high frequency reproducibility is reduced as compared with a Bayer array because ratios of the number of pixels of R, the number of pixels of G, and the number of pixels of B are equal. Note that in the case of the Bayer array, a ratio of the number of G pixels that help most to obtain a brightness signal is twice as great as each ratio of the number of R pixels and the number of B pixels.

On the other hand, the color imaging device discussed in PTL 4 is not effective in a false color of a high frequency part in the horizontal or vertical direction because a ratio of the number of G pixels to each ratio of the number of R pixels and the number of B pixels is higher than that of the Bayer array, and a line of only G pixels exists in the horizontal or vertical direction.

The present invention is made in view of these circumstances, and an object of the present invention is to provide a color imaging device that can reduce occurrence of a false color, achieves high resolution, and simplify subsequent processing as compared with a conventional random array.

Solution to Problem

In order to attain the object, a color imaging device according to an aspect of the present invention is a single-panel type color imaging device in which a color filter of a certain color filter array is disposed on a plurality of pixels that are constituted by photoelectric conversion devices that are arranged in a horizontal direction and a vertical direction, and in the color imaging device, the color filter array includes a basic array pattern of N×N (N: odd number of 3 or more), in which a first filter that corresponds to a first color that contributes most to obtaining a brightness signal and second filters that correspond to two or more second colors other than the first color are arranged, and the basic array pattern is repeatedly arranged in the horizontal direction and the vertical direction, the first filter is arranged on two diagonal lines in the basic array pattern, and a ratio of the number of pixels of the first color that correspond to the first filter is greater than a ratio of the number of pixels of each of the second colors that correspond to the second filters.

In the color imaging device according to the aspect of the present invention, the basic array pattern of N×N (N: odd number of 3 or more), in which the first filter that corresponds to the first color that contributes most to obtaining a brightness signal and the second filters that correspond to the two or more second colors other than the first color are arranged is repeatedly arranged in the horizontal direction and the vertical direction. As a result, subsequent synchronization (interpolation) processing can be repeatedly executed in accordance with the pattern when the processing is executed, so that the subsequent processing can be simplified as compared with the conventional random array.

In addition, reproduction accuracy of the synchronization processing in a high frequency area can be improved because the first filter that corresponds to the first color that contributes most to obtaining a brightness signal is arranged on two diagonal lines in the basic array pattern, that is, the one or more first filters are arranged in each line of the horizontal, vertical, and diagonal (NE and NW) directions of the color filter array. In addition, aliasing can be suppressed and the high frequency reproducibility can be improved because a ratio of the number of pixels of the first color that corresponds to the first filter is made different from a ratio of the number of pixels of each of the second colors that respectively correspond to the second filters, and in particular, the ratio of the number of pixels of the first color that contributes most to obtaining a brightness signal is made greater than the ratio of the number of pixels of each of the colors of the second colors that respectively correspond to the second filters.

In a color imaging device according to another aspect of the present invention, it is desirable that the basic array pattern includes 3×3 pixels. That is, it is the most desirable that the basic array pattern includes 3×3 pixels.

In a color imaging device according to another aspect of the present invention, it is desirable that the first filter and the second filters are arranged so that the color filter array and a color filter array that is obtained by down-sampling the color filter array to $\frac{1}{2^n}$ (n: natural number) in the horizontal direction or the vertical direction are substantially identical. As a result, imaging processing at the time of capturing a still image and imaging processing at the time of capturing a moving image can be set as common processing.

In a color imaging device according to another aspect of the present invention, it is desirable that the first filter and the second filters are arranged so that the color filter array and a color filter array that is obtained by down-sampling the color filter array to $\frac{1}{4^n}$ (n: natural number) in the horizontal direction or the vertical direction are substantially identical. As a result, the imaging processing at the time of capturing a still image and the imaging processing at the time of capturing a moving image can be set as common processing.

In a color imaging device according to another aspect of the present invention, it is desirable that the first filters are arranged so that an array of the first filters in the color filter array and an array of the first filters in a color filter array that is obtained by down-sampling the color filter array to $\frac{1}{2^n}$ (n: natural number) in the horizontal direction or the vertical direction are substantially identical. That is, an arrangement of the first filter that is the main of the imaging processing is substantially identical regardless whether or not down-sampling/reading-out processing is executed. As a result, load of the imaging processing can be reduced.

In a color imaging device according to another aspect of the present invention, it is desirable that the one or more first filters are arranged in each line of horizontal, vertical, upper right diagonal, and lower right diagonal directions of the color filter array. The above-described case is satisfied when the first filter is arranged on the two diagonal lines in the basic array pattern.

In a color imaging device according to another aspect of the present invention, it is desirable that the color filter array includes a square array that corresponds to 2×2 pixels that are constituted by the first filter. As a result, using pixel values of the 2×2 pixels, a direction having high correlation can be determined from the horizontal, vertical, upper right diagonal, and lower right diagonal directions.

In a color imaging device according to another aspect of the present invention, it is desirable that the color filter array in the certain basic array pattern is point symmetrical with respect to the center of the basic array pattern. As a result, the circuit scale of a processing circuit that is provided in downstream can be reduced.

In a color imaging device according to another aspect of the present invention, it is desirable that the color filter array in the certain basic array pattern is line symmetrical with respect to at least one of the lines of horizontal, vertical, upper right diagonal, and lower right diagonal directions that passes through the center of the basic array pattern. As a result, the circuit scale of a processing circuit that is provided in downstream can be reduced.

In a color imaging device according to another aspect of the present invention, it is desirable that the first color is a green (G) color, and the second colors are a red (R) color and a blue (B) color.

In a color imaging device according to another aspect of the present invention, it is desirable that the color filter includes an R filter, a G filter, and a B filter that respectively correspond to the red (R) color, the green (G) color, and the blue (B) color, and the basic array pattern is a square array pattern that corresponds to 3×3 pixels, and in the basic array pattern, the G filters are arranged at the center and the four corners, the B filters or the R filters are arranged in the vertical direction and filters of the B filters or the R filters that are not arranged in the vertical direction are arranged in the horizontal direction while sandwiching the G filter that is arranged at the center. The basic array pattern is an example of a basic pattern of 3×3 pixels, in which the G filter is arranged on the two diagonal lines in the basic array pattern.

In a color imaging device according to another aspect of the present invention, it is desirable that the color filter includes an R filter, a G filter, and a B filter that respectively correspond to the red (R) color, the green (G) color, and the blue (B) color, and the basic array pattern is a square array pattern that corresponds to 3×3 pixels, and in the basic array pattern, the G filters are arranged at the center and the four corners, the B filters or the R filters are arranged at the upper middle, and the middle left or the middle right, and filters of the B filters or the R filters that are not arranged at the upper middle are arranged in the other frames. The basic array pattern is an example of a basic pattern of 3×3 pixels, in which the G filters are arranged on the two diagonal lines in the basic array pattern.

Advantageous Effects of Invention

According to the present invention, occurrence of false color can be reduced, the high resolution can be achieved, and subsequent processing can be simplified as compared with the conventional random array.

BRIEF DESCRIPTION OF THE DRAWINGS

FIG. 6 is a diagram illustrating a second embodiment of the single-panel type color imaging device according to the present invention.

FIG. 7 is a diagram illustrating a color filter array of the color imaging device of the second embodiment, which is down-sampled to ½″ in the horizontal direction, (A) portion of FIG. 7 illustrates a case in which the color filter array is down-sampled to ½, (B) portion of FIG. 7 illustrates a case in which the color filter array is down-sampled to ¼, and (C) portion of FIG. 7 illustrates a case in which the color filter array is down-sampled to ⅛.

FIG. 8 is a diagram illustrating the color filter array of the color imaging device of the second embodiment, which is down-sampled to ½″ in the vertical direction, (A) portion of FIG. 8 illustrates a case in which the color filter array is down-sampled to ½, (B) portion of FIG. 8 illustrates a case in which the color filter array is down-sampled to ¼, and (C) portion of FIG. 8 illustrates a case in which the color filter array is down-sampled to ⅛.

FIG. 10 is a diagram illustrating a color filter array of the color imaging device of the third embodiment, which is down-sampled to ½″ in the vertical direction, (A) portion of FIG. 10 illustrates a case in which the color filter array is down-sampled to ½, (B) portion of FIG. 10 illustrates a case in which the color filter array is down-sampled to ¼, and (C) portion of FIG. 10 illustrates a case in which the color filter array is down-sampled to ⅛.

FIG. 12 is a diagram illustrating a fifth embodiment of the single-panel type color imaging device according to the present invention.

FIG. 13 is a diagram illustrating a color filter array of the color imaging device of the fifth embodiment, which is down-sampled to ¼″ in the horizontal direction, (A) portion of FIG. 13 illustrates a case in which the color filter array is down-sampled to ¼, and (B) portion of FIG. 13 illustrates a case in which the color filter array is down-sampled to 1/16.

FIG. 19 is a diagram illustrating a color filter array of the color imaging device of sixth embodiment, which is down-sampled to ¼″ in the vertical direction, (A) portion of FIG. 19 illustrates a case in which the color filter array is down-sampled to ¼, and (B) portion of FIG. 19 illustrates a case in which the color filter array is down-sampled to 1/16.

FIG. 20 is a diagram illustrating the color filter array of the color imaging device of sixth embodiment, which is down-sampled to ½″ in the vertical direction, (A) portion of FIG. 20 illustrates a case in which the color filter array is down-sampled to ½, and (B) portion of FIG. 20 illustrates a case in which the color filter array is down-sampled to ⅛.

FIG. 21 is a diagram illustrating a seventh embodiment of the single-panel type color imaging device according to the present invention.

DETAILED DESCRIPTION OF THE INVENTION

Preferred embodiments of a color imaging device according to the present invention are described below with reference to the accompanying drawings.

First Embodiment

Figure 1:
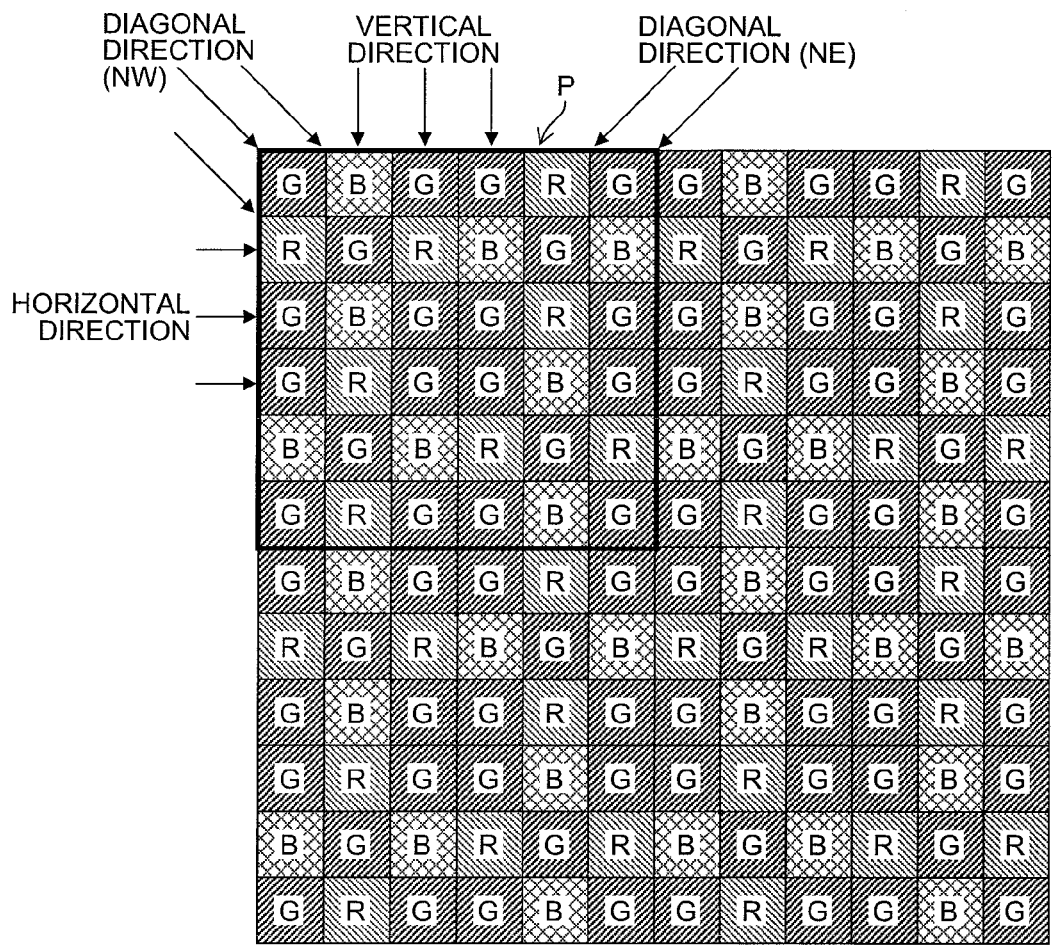
FIG. 1 is a diagram illustrating a first embodiment of a single-panel type color imaging device according to the present invention.

FIG. 1 is a diagram illustrating a first embodiment of a single-panel type color imaging device according to the present invention, and in particular, illustrating a color filter array of color filters that are provided in the color imaging device.

The color imaging device includes a plurality of pixels (not illustrated) that are constituted by photoelectric conversion devices that are arranged in the horizontal direction and the vertical direction (two-dimensional array), and color filters of a color filter array that is illustrated in FIG. 1 and arranged on a light receiving surfaces of each pixel, and any of the color filters of three primary colors of red (R), green (G), and blue (B) is arranged on each of the pixels.

Note that the color imaging device is not limited to a CCD (Charge Coupled Device) color imaging device, and may be another type of imaging device such as a CMOS (Complementary Metal Oxide Semiconductor) imaging device.

<Features of the Color Filter Array>

The color filter array of the color imaging device of the first embodiment includes the following features (1), (2), (3), (4), (5), and (6).

(Feature (1))

The color filter array illustrated in FIG. 1 includes a basic array pattern P (pattern indicated by the thick frame) that is constituted by a square array pattern that corresponds to 6×6 pixels, and in the color filter array, the basic array pattern P is repeatedly arranged in the horizontal direction and the vertical direction. That is, in the color filter array, the color filters of R, G, and B (the R filter, the G filter, and the B filter) are arranged with a certain cyclic nature.

Synchronization (interpolation) processing, etc. (demosaic processing) for R, G, and B signals that are read out from the color imaging device can be executed in accordance with the repeat pattern because the R filter, the G filter, and the B filter are arranged with the certain cyclic nature as described above.

In addition, when an image is reduced by executing down-sampling processing in unit of the basic array pattern P, a color filter array of the reduced image on which the down-sampling processing was executed can be the same as the color filter array before the down-sampling processing, so that a common processing circuit can be used.

(Feature (2))

In the color filter array illustrated in FIG. 1, G filters that correspond to a color that contributes most to obtaining a brightness signal (color of G in the embodiment) are arranged in each line of the horizontal, vertical, and diagonal (NE and NW) direction of the color filter array. This is the effect that is obtained by arranging the G filters on the both diagonal lines in the basic array pattern of odd number×odd number. Note that NE indicates the upper right diagonal direction, and NW indicates the lower right diagonal direction. For example, in a case of a square pixel array, the upper right diagonal and lower right diagonal directions are directions of 45° with respect to the horizontal direction, and in a case of a rectangle pixel array, the upper right diagonal and lower right diagonal directions are directions of diagonal lines of the rectangle, and the angles vary depending on the lengths of long side and short side. That is, the upper right diagonal direction is a direction of a diagonal line that rises to the right, of two diagonal lines of pixels, and the lower right diagonal direction is a direction of a diagonal line that rises to the left, of the two diagonal lines of pixels.

The reproduction accuracy of the synchronization processing in a high frequency area can be improved regardless of a direction having a high frequency because the G filters that correspond to the brightness system pixel are arranged in each line of the horizontal, vertical, and diagonal (NE and NW) directions of the color filter array.

(Feature (3))

In the basic array pattern of the color filter array illustrated in FIG. 1, the number of pixels of the R pixel, the G pixel, and the B pixel that correspond to the R filter, the G filter, and the B filter are 8 pixels, 20 pixels, 8 pixels, respectively. That is, a proportion of the number of pixels of the R pixel, the G pixel, and the B pixel is 2:5:2, and a ratio of the number of G pixels that help most to obtain a brightness signal is greater than each ratio of the number of R pixels or the number of B pixels.

As described above, the ratio of the number of G pixels is different from the each of the ratios of the number of R pixels and the number of B pixels, and in particular, the ratio of the number of G pixels that help most to obtain a brightness signal is greater than each of the ratios of the number of R pixels and the number of B pixels, so that aliasing at the time of the synchronization processing can be suppressed, and the high frequency reproducibility can be also improved.

(Feature (4))

In the color filter array illustrated in FIG. 1, the one or more R filters and the one or more B filters that are correspond to the other two or more colors (colors of R and B in the embodiment) other than the above-described color of G are arranged in each line of the horizontal and vertical directions of the color filter array in the basic array pattern P.

The R filter and the B filter are arranged in each line of the horizontal and vertical directions of the color filter array, so that occurrence of color moire (false color) can be suppressed. As a result, an optical low pass filter to suppress the occurrence of the false color may not be arranged in an optical path that extends from an incidence surface of an optical system to an imaging surface, and even in a case in which an optical low pass filter is employed, the optical low pass filter having a weak effect to cut a high frequency component to inhibit the occurrence of the false color can be employed, so that it is possible to avoid compromising the resolution.

Figure 2:
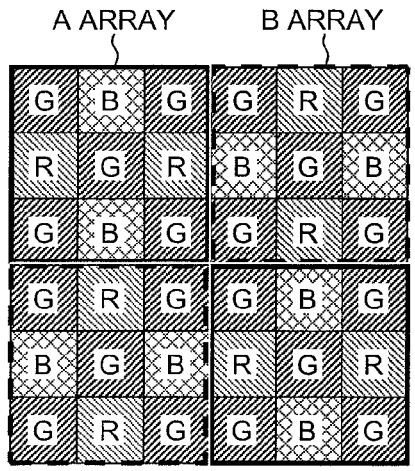
FIG. 2 is a diagram illustrating a basic array pattern that is included in color filter array of the color imaging device of the first embodiment.

FIG. 2 illustrates a state in which the basic array pattern P illustrated in FIG. 1 is divided into four of 3×3 pixels.

As illustrated in FIG. 2, it can be understood that the basic array pattern P includes an array in which an A array of 3×3 pixels that are enclosed by the frame of solid line and a B array of 3×3 pixels that are enclosed by the frame of broken line are alternately arranged in the horizontal direction and the vertical direction.

In each of the A array and the B array, the G filters that are brightness system pixels are arranged at the four corners and the center, that is, arranged on the both diagonal lines. In addition, in the A array, the R filters are arranged in the horizontal direction and the B filters are arranged in the vertical direction while sandwiching the G filter that is arranged at the center, and on the other hand, in the B array, the B filters are arranged in the horizontal direction and the R filters are arranged in the vertical direction while sandwiching the G filter that is arranged at the center. That is, in the A array and the B array, positional relationship of the R filter and the B filter is reversed, however, the other arrangements are same.

Figure 3:
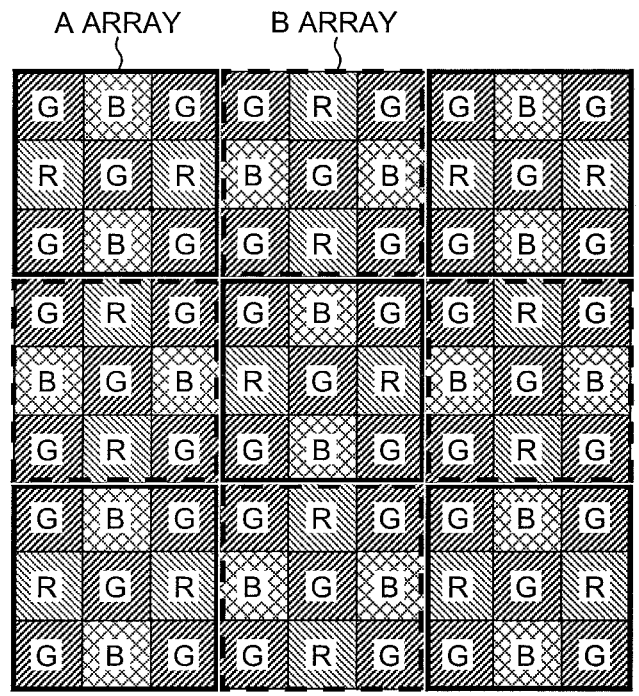
FIG. 3 is a diagram illustrating a state in which a basic array pattern of 6×6 pixels that is included in the color filter array of the color imaging device of the first embodiment is divided into an A array and a B array of 3×3 pixels, and the A array and the B array are arranged.

In addition, as illustrated in FIG. 3, the G filters that are arranged at the four corners of the A array and the B array correspond to a G filter of a square array of 2×2 pixels by alternately arranging the A array and the B array in the horizontal and vertical directions.

This is why the G filter of the square array that corresponds to 2×2 pixels is formed by arranging the G filters that are brightness system pixels at the four corners and the center, that is, arranged on the two diagonal lines, in the 3×3 pixels of the A array or the B array, and alternately arranging the 3×3 pixels in the horizontal and vertical directions. Note that, by such an array, the above-described features (1), (2), and (3), and the following feature (5) are satisfied.

(Feature (5))

The color filter array illustrated in FIG. 1 includes a square array that corresponds to 2×2 pixels that are constituted by the G filters.

Figure 4:
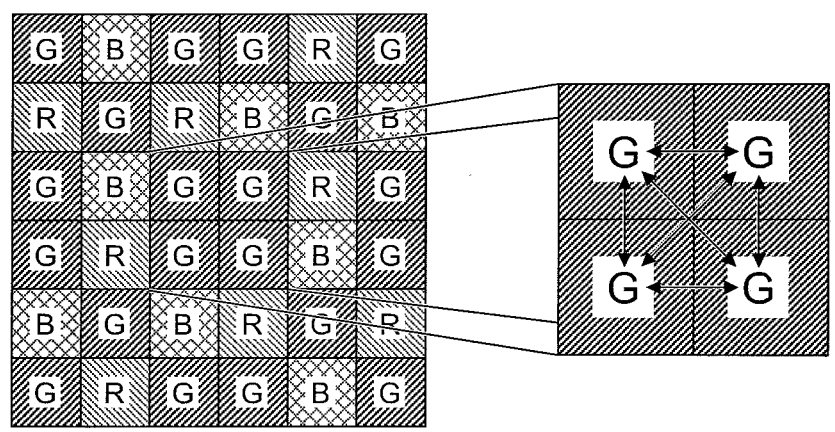
FIG. 4 is a diagram used to explain a method of determining a correlation direction from pixel values of G pixels of 2×2 pixels that are included in the color filter array of the color imaging device of the first embodiment.

As illustrated in FIG. 4, it can be determined that there is a correlation in a direction having a small difference absolute value, out of the horizontal direction, the vertical direction, and the diagonal directions by extracting the 2×2 pixels that are constituted by the G filters, and obtaining a difference absolute value between pixel values of G pixels in the horizontal direction, a difference absolute value between pixel values of G pixels in the vertical direction, and a difference absolute value between pixel values of G pixels in the diagonal directions (upper right diagonal and upper left diagonal directions).

That is, in this color filter array, using information of G pixels having a minimum pixel distance, a direction having a high correlation can be determined from the horizontal direction, the vertical direction, and the diagonal directions. This direction determination result can be used for the processing to perform interpolation from the surrounding pixel (synchronization processing).

In addition, as illustrated in FIG. 3, when pixels in the A array or the B array of 3×3 pixels are set as target pixels of the synchronization processing, and 5×5 pixels (local area of the mosaic image) are extracted using the center pixel of the A array or the B array as the center, G pixels of 2×2 pixels exist at each of the four corners of the 5×5 pixels. By using pixel values of the G pixels of 2×2 pixels, determination of a correlation direction in the four directions can be accurately performed by using the information of G pixels of the minimum pixel distance.

(Feature (6))

The basic array pattern of the color filter array illustrated in FIG. 1 is symmetrical. That is, the basic array pattern is point symmetrical with respect to the center of the basic array pattern (the center of four G filters). In addition, as illustrated in FIG. 2, the A array and the B array in the basic array pattern are also point symmetrical with respect to the G filter at the center. In addition, the A array and the B array in the basic array pattern is line symmetrical with respect to the lines of the horizontal direction or the vertical direction that pass through the center of the A array and the B array (center of the G filter at the center), respectively.

By such symmetry, the circuit size of a processing circuit that is provided downstream can be reduced and simplified.

Figure 5:
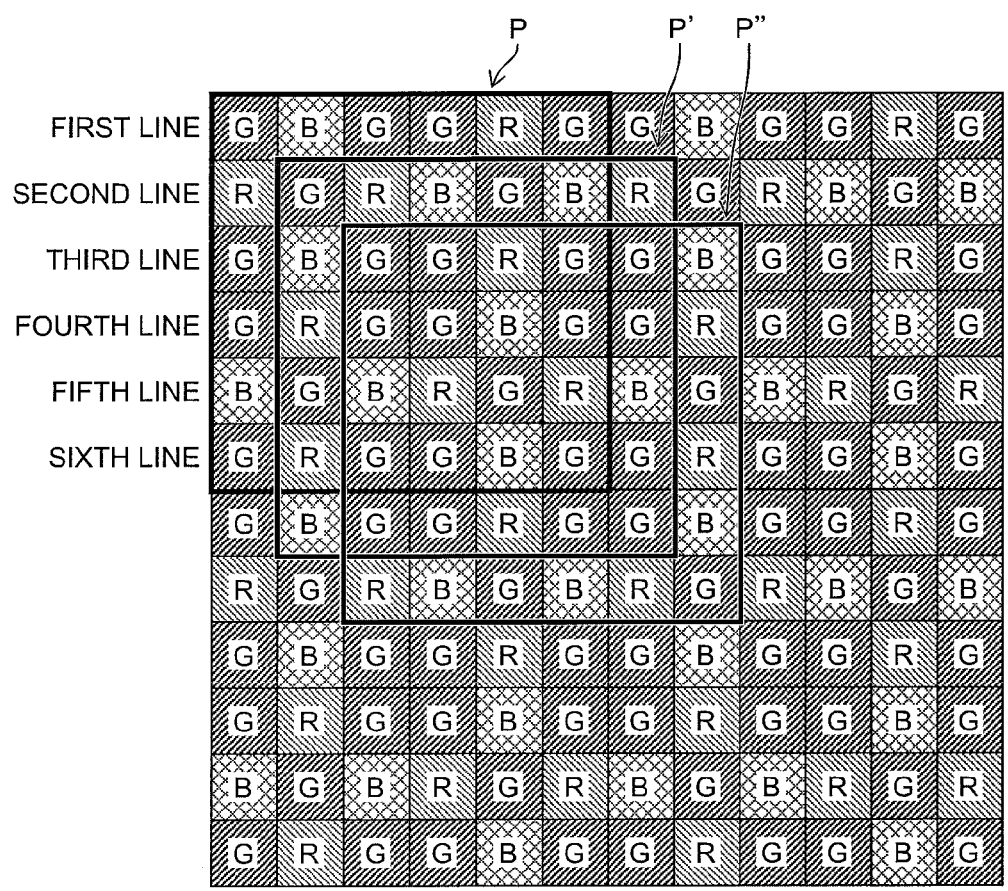
FIG. 5 is a diagram used to explain a concept of the basic array pattern that is included in the color filter array of the color imaging device.

As illustrated in FIG. 5, in the basic array pattern P that is indicated by the thick frame, color filter arrays of the first and third lines out of the first to sixth lines in the horizontal direction are G B G G R G, a color filter array of the second line is R G R B G B, color filter arrays of the fourth and sixth lines are G R G G B G, and a color filter array of the fifth line is B G B R G R.

Here, in FIG. 5, in a case in which a basic array pattern that is obtained by shifting the basic array pattern P by one pixel in the horizontal direction and the vertical direction is set as a basic array pattern P', and a basic array pattern that is obtained by shifting the basic array pattern P by two pixels in the horizontal direction and the vertical direction is set as a basic array pattern P'', the same color filter array is obtained even when the basic array patterns P' and P'' are repeatedly arranged in the horizontal direction and the vertical direction.

That is, there is a plurality of basic array patterns that can constitute the color filter array illustrated in FIG. 5 by repeatedly arranging the basic array pattern in the horizontal direction and the vertical direction. In the first embodiment, for convenience, the basic array pattern P in which the basic array pattern is point symmetrical is referred to as a basic array pattern.

Note that, in a color filter array according to the other embodiments that are described below, there is a plurality of basic array patterns for each color filter array, however the typical pattern is referred to as a basic array pattern of the color filter array.

Second Embodiment

Figure 6:
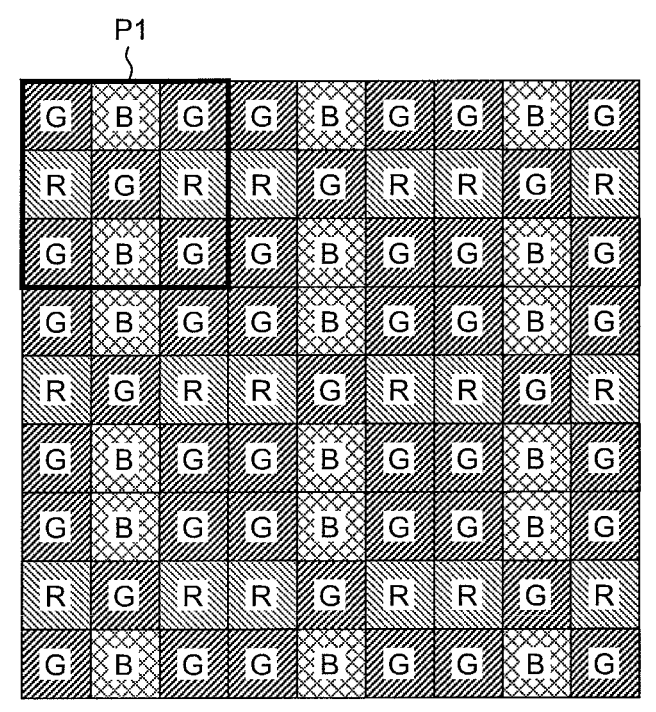

FIG. 6 is a diagram illustrating a second embodiment of the single-panel type color imaging device according to the present invention, and in particular, a color filter array of color filters that are provided in the color imaging device.

The color filter array of the color imaging device of the second embodiment has the same features as the features (1), (2), (3), (5), and (6) of the color filter array of the color imaging device of the first embodiment and a feature (7) that is not included in the color filter array of the color imaging device of the first embodiment. Note that the detailed description of the same portions as that of the first embodiment is omitted.

(Feature (1))

The color filter array illustrated in FIG. 6 includes the basic array pattern P1 that is constituted by a square array pattern that corresponds to 3×3 pixels (pattern that is indicated by the thick frame), and the basic array pattern P1 is repeatedly arranged in the horizontal direction and the vertical direction. That is, in the color filter array, the color filters of R, G, and B (the R filter, the G filter, and the B filter) are arranged with a certain cyclic nature.

In the basic array pattern P1, the G filters that are brightness system pixels are arranged at the four corners and the center, that is, arranged on the both diagonal lines. In addition, in the basic array pattern P1, the R filters are arranged in the horizontal direction and the B filters are arranged in the vertical direction while sandwiching the G filter that is arranged at the center. That is, the basic array pattern P1 has the same arrangement as the A array in the first embodiment.

(Feature (2))

In the color filter array illustrated in FIG. 6, the G filters that correspond to a color that contributes most to obtaining a brightness signal (color of G in the embodiment) are arranged in the each line of the horizontal, vertical, and diagonal (NE and NW) directions of the color filter array.

(Feature (3))

In the basic array pattern of the color filter array illustrated in FIG. 6, the number of pixels of the R pixel, the G pixel, and the B pixel that correspond to the R filter, the G filter, and the B filter are 2 pixels, 5 pixels, and 2 pixels, respectively. That is, a proportion of the number of R pixels, the number of G pixels, and the number of B pixels is 2:5:2, a ratio of the number of G pixels that help most to obtain a brightness signal is greater than each ratio of the number of R pixels and the number of B pixels that correspond to the colors other than G.

(Feature (5))

The color filter array illustrated in FIG. 6 includes a square array that corresponds to 2×2 pixels that are constituted by the G filters. That is, in the basic array pattern P1, because the G pixels are arranged at the four corners, when the two basic array patterns P1 are arranged in the horizontal direction and the vertical direction, that is, four patterns in total, the square array that corresponds to the 2×2 pixels that are constituted by the G filters appears at the center. In addition, when 5×5 pixels (local area of the mosaic image) is extracted using the basic array pattern P1 as the center, the G pixels of 2×2 pixels exist at each of the four corners of the 5×5 pixels.

(Feature (6))

The basic array pattern P1 of the color filter array illustrated in FIG. 6 is point symmetrical with respect to the center of the basic array pattern P1 (center of the four G filters). In addition, the basic array pattern P1 is line symmetrical with respect to the line of the horizontal direction or the vertical direction that passes through the center of the basic array pattern P1 (center of the G filter that is arranged at the center).

(Feature (7))

In the color filter array illustrated in FIG. 6, a color filter array that is obtained by down-sampling the color filter array to $1/2^n$ (n is a natural number) in the horizontal direction or the vertical direction is substantially the same as the original color filter array. That is, a color filter array that is obtained by reading out a line every $1/2^n$ (n is a natural number) lines in the horizontal direction or the vertical direction is substantially the same as the original color filter array.

FIG. 7 illustrates a color filter array that is obtained by down-sampling and reading out the color filter array illustrated in FIG. 6 in the horizontal direction, (A) portion of FIG. 7 illustrates the result of ½ down-sampling, (B) portion of FIG. 7 illustrates the result of ¼ ($1/2^2$) down-sampling, and (C) portion of FIG. 7 illustrates the result of ⅛ ($1/2^3$) down-sampling. Numbers that are assigned in FIG. 7 respectively indicate rows that are extracted when numbers such as the first, second, third, . . . rows are assigned from the upper left of the color filter array illustrated in FIG. 6 in the horizontal direction. Note that, in FIG. 7, for explanation, the only first to third lines of the color filter array illustrated in FIG. 6 are displayed.

In the color filter array illustrated in (A) portion of FIG. 7, which is down-sampled to ½, the third, fifth, and seventh rows and the first to third lines are included in the basic array pattern P1, and the basic array pattern P1 repeatedly appears in the horizontal direction and the vertical direction. That is, the color filter array that is down-sampled to ½ is the same as the original color filter array except for the first row.

In the color filter array illustrated in (B) portion of FIG. 7, which is down-sampled to ¼, the first, fifth, and ninth rows and the first to third lines are included in the basic array pattern P1, and the basic array pattern P1 repeatedly appears in the horizontal direction and the vertical direction. That is, the color filter array that is down-sampled to ¼ is the same as the original color filter array.

In the color filter array illustrated in (C) portion of FIG. 7, which is down-sampled to ⅛, the ninth, 17th, and 25th rows and the first to third lines are included in the basic array pattern P1, and the basic array pattern P1 repeatedly appears in the horizontal direction and the vertical direction. That is, the color filter array that is down-sampled to ⅛ is the same as the original color filter array except for the first row.

Figure 8:
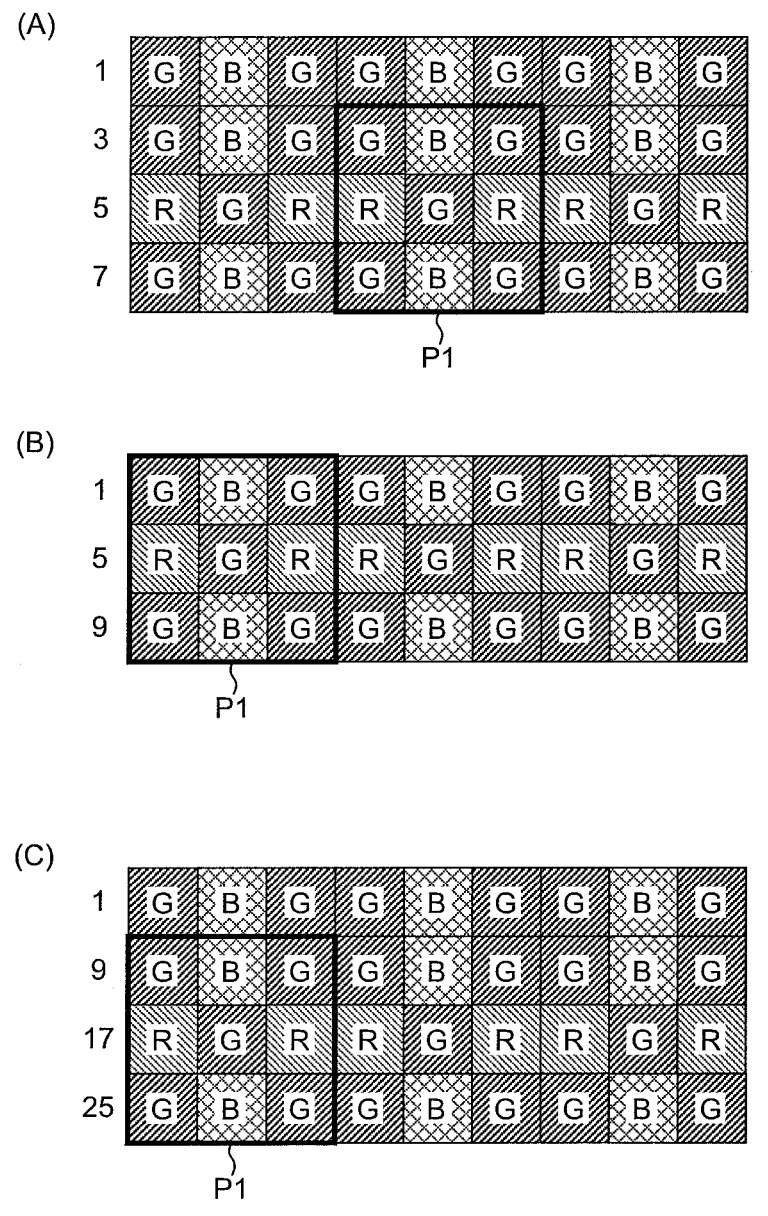

FIG. 8 illustrates a color filter array that is obtained by down-sampling and reading out the color filter array illustrated in FIG. 6 in the vertical direction, (A) portion of FIG. 8 illustrates the result of ½ down-sampling, (B) portion of FIG. 8 illustrates the result of ¼ ($1/2^2$) down-sampling, and (C) portion of FIG. 8 illustrates the result of ⅛ ($1/2^3$) down-sampling. Numbers that are assigned in FIG. 8 respectively indicate lines that are extracted when numbers such as the first, second, third, . . . lines are assigned from the upper left of the color filter array illustrated in FIG. 6 in the vertical direction. Note that, in FIG. 8, for explanation, the only first to ninth rows of the color filter array illustrated in FIG. 6 are displayed.

In the color filter array illustrated in (A) portion of FIG. 8, which is down-sampled to ½, the third, fifth, and seventh lines and the first to third rows are included in the basic array pattern P1, and the basic array pattern P1 repeatedly appears in the horizontal direction and the vertical direction. That is, the color filter array that is down-sampled to ½ is the same as the original color filter array except for the first line.

In the color filter array illustrated in (B) portion of FIG. 8, which is down-sampled to ¼, the first, fifth, ninth lines and the first to third rows are included in the basic array pattern P1, and the basic array pattern P1 repeatedly appears in the horizontal direction and the vertical direction. That is, the color filter array that is down-sampled to ¼ is the same as the original color filter array.

In the color filter array illustrated in (C) portion of FIG. 8, which is down-sampled to ⅛, the ninth, 17th, and 25th lines and the first to third rows are included in the basic array pattern P1, and the basic array pattern P1 repeatedly appears in the horizontal direction and the vertical direction. That is, the color filter array that is down-sampled to ⅛ is the same as the original color filter array except for the first line.

At the time of capturing a still image, an image is captured using all pixels, but at the time of capturing a moving image, a color filter array is down-sampled and read to $1/2^n$ in the vertical direction (or horizontal direction) to obtain an image because high-speed processing is desired. When the original color filter array and a color filter array that is obtained by down-sampling the color filter array to $1/2^n$ are substantially the same, so that the imaging processing at the time of capturing a still image and the imaging processing at the time of capturing a moving image can be set as common processing.

Note that, in the embodiment, the basic array pattern P1 (A array in the first embodiment) is used in which the G filters are arranged on the diagonal lines, and the R filters are arranged in the horizontal direction and the B filters are arranged in the vertical direction while sandwiching the G filter that is arranged at the center, and even when a basic array pattern in which the positional relationship between the R filter and the B filter is reversed, that is, a pattern that is the same as the B array of the first embodiment in which the B filters are arranged in the horizontal direction and the R filters are arranged in the vertical direction while sandwiching the G filter that is arranged at the center is used, a color filter having the same feature can be obtained.

Third Embodiment

Figure 9:
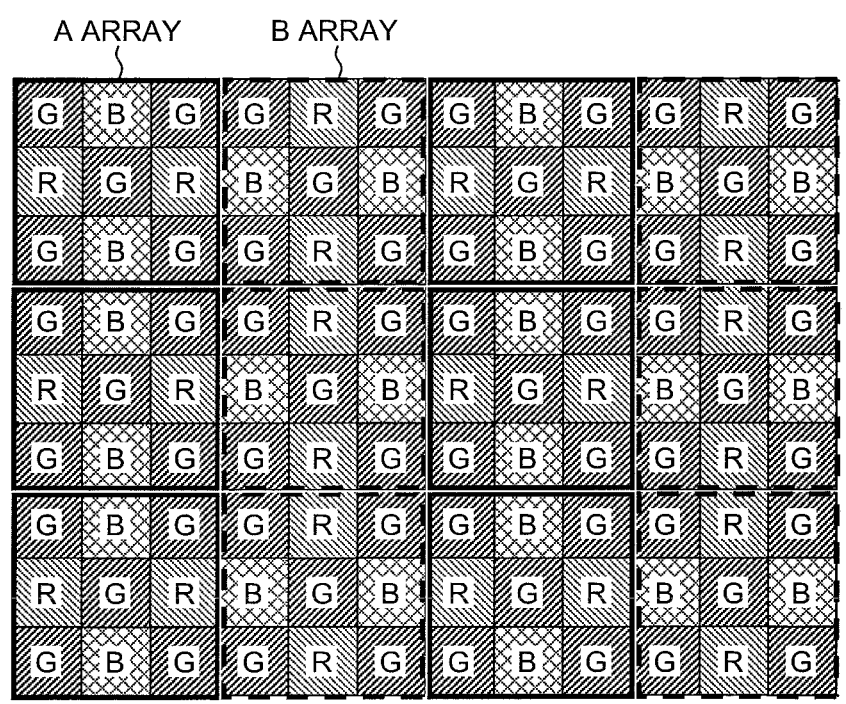
FIG. 9 is a diagram illustrating a third embodiment of the single-panel type color imaging device according to the present invention.

FIG. 9 illustrates a third embodiment of the single-panel type color imaging device according to the present invention, in particular, a color filter array of color filters that are provided in the color imaging device.

The color filter array of the color imaging device of the third embodiment includes the same features as the features (1), (2), (3), (5), and (6) of the color filter array of the color imaging device of the first embodiment and the feature (7) of the color filter array of the color imaging device of the second embodiment. Note that the detailed description of the same portions as that of the first embodiment and the second embodiment is omitted.

(Feature (1))

In the color filter array illustrated in FIG. 9, a basic array pattern that is constituted by a square array pattern that corresponds to 3×6 pixels is repeatedly arranged in the horizontal direction and the vertical direction. In the basic array pattern, the G filters that are brightness system pixels are arranged at the four corners and the center, that is, arranged on the both diagonal lines.

The basic array pattern includes an A array in which the R filters are arranged in the horizontal direction and the B filters are arranged in the vertical direction while sandwiching the G filter that is arranged at the center and a B array in which the B filters are arranged in the horizontal direction and the R filters are arranged in the vertical direction while sandwiching the G filter that is arranged at the center. The A array and the B array are same as the A array and the B array in the first embodiment.

The B array is arranged on the right side of the A array, and the A array is arranged on the right side of the B array. In addition, the array is repeatedly arranged in the vertical direction. That is, in the color filter array, the color filters of R, G, and B (the R filter, the G filter, and the B filter) are arranged with a certain cyclic nature (the G filter in 3×3 and the R filter and the B filter in 3×6).

(Feature (2))

In the color filter array illustrated in FIG. 9, the G filters that correspond to a color that contributes most to obtaining a brightness signal (color of G in the embodiment) are arranged in each line of the horizontal, vertical, and diagonal (NE and NW) directions of the color filter array.

(Feature (3))

In the basic array pattern (the A array and the B array) of the color filter array illustrated in FIG. 9, the number of pixels of the R pixel, the G pixel, and the B pixel that correspond to the R filter, the G filter, and the B filter are 2 pixels, 5 pixels, and 2 pixels, respectively. That is, a proportion of the number of R pixels, the number of G pixels, and the number of B pixels is 2:5:2, and a ratio of the number of G pixels that help most to obtain a brightness signal is greater than each ratio of the number of R pixels and the number of B pixels that correspond to the colors other than G.

(Feature (5))

The color filter array illustrated in FIG. 9 includes a square array that corresponds to 2×2 pixels that are constituted by the G filters. That is, in the basic array pattern P1, because the G pixels are arranged at the four corners, when the A array and the B array are arranged two arrays each in the horizontal direction and the vertical direction, that is, four arrays in total, the square array that corresponds to the 2×2 pixels that are constituted by the G filters appears at the center. In addition, when 5×5 pixels (local area of the mosaic image) is extracted using the A array or the B array as the center, the G pixels of 2×2 pixels exist at each of the four corners of the 5×5 pixels.

(Feature (6))

The basic array patterns (the A array and the B array) of the color filter array illustrated in FIG. 9 are point symmetrical with respect to the centers of the A array and the B array (center of the four G filters), respectively. In addition, the A array and the B array are line symmetrical with respect to the lines of the horizontal direction or the vertical direction that pass through the centers of the A array and the B array (center of the G filter that is arranged at the center), respectively.

(Feature (7))

In the color filter array illustrated in FIG. 9, a color filter array that is down-sampled to $½^n$ in the vertical direction is substantially the same as the original color filter array.

FIG. 10 illustrate a color filter array that is obtained by down-sampling and reading out the color filter array illustrated in FIG. 9 in the vertical direction, (A) portion of FIG. 10 illustrates the result of ½ down-sampling, (B) portion of FIG. 10 illustrates the result of ¼ ($½^2$) down-sampling, and (C) portion of FIG. 10 illustrates the result of ⅛ ($½^3$) down-sampling. Numbers that are assigned in FIG. 10 respectively indicate lines that are extracted when numbers such as the first, second, third, . . . lines are assigned from the upper left of the color filter array illustrated in FIG. 9 in the vertical direction. Note that, in FIG. 10, for explanation, the only first to sixth rows of the color filter array illustrated in FIG. 9 are displayed.

In the color filter array illustrated in (A) portion of FIG. 10, which is down-sampled to ½, the third, fifth, and seventh lines and the first to third rows are included in the A array, and the A array repeatedly appears in the vertical direction. In addition, the third, fifth, and seventh lines and the fourth to sixth rows are included in the B array, and the B array repeatedly appears in the vertical direction. That is, the color filter array that is down-sampled to ½ is the same as the original color filter array except for the first line.

In the color filter array illustrated in (B) portion of FIG. 10, which is down-sampled to ¼, the first, fifth, and ninth lines and the first to third rows are included in the A array, and the A array repeatedly appears in the vertical direction. In addition, the first, fifth, and ninth lines and the fourth to sixth rows are included in the B array, and the B array repeatedly appears in the vertical direction. That is, the color filter array that is down-sampled to ¼ is the same as the original color filter array.

In the color filter array illustrated in (C) portion of FIG. 10, which is down-sampled to ⅛, the ninth, 17th, and 25th lines and the first to third rows are included in the A array, and the A array repeatedly appears in the vertical direction. In addition, the ninth, 17th, and 25th lines and the fourth to sixth rows are included in the B array, and the B array repeatedly appears in the vertical direction. That is, the color filter array that is down-sampled to ⅛ is the same as the original color filter array except for the first line.

Note that, in the embodiment, the A array and the B array are arranged in the horizontal direction, and the arrays are repeatedly arranged in the vertical direction, however, color filter having the same feature can be obtained even when the A array and the B array are arranged in the vertical direction, and the arrays are repeatedly arranged in the horizontal direction. However, the feature (7) is a feature in which the horizontal direction and the vertical direction are switched, and a color filter array that is down-sampled to $½^n$ in the horizontal direction is substantially the same as the original color filter array.

Fourth Embodiment

Figure 11:
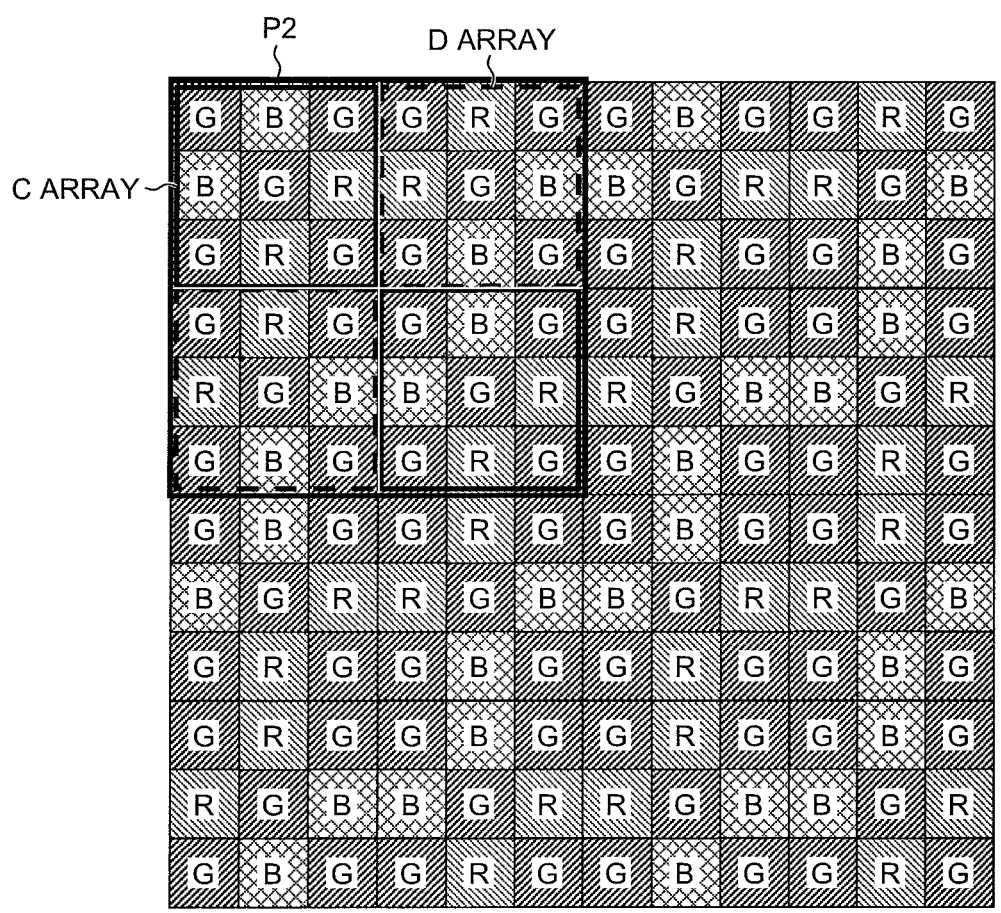
FIG. 11 is a diagram illustrating a fourth embodiment of the single-panel type color imaging device according to the present invention.

FIG. 11 illustrates a fourth embodiment of the single-panel type color imaging device according to the present invention, in particular, a color filter array of color filters that are provided in the color imaging device.

The color filter array of the color imaging device of the fourth embodiment includes the same features as the features (1), (2), (3), (4), (5), and (6) of the color filter array of the color imaging device of the first embodiment. Note that the detailed description of the same portions as that of the first embodiment is omitted.

(Feature (1))

The color filter array illustrated in FIG. 11 includes the basic array pattern P2 that is constituted by a square array pattern that corresponds to 6×6 pixels (pattern that is indicated by the thick frame), and in the color filter array, the basic array pattern P2 is repeatedly arranged in the horizontal direction and the vertical direction. That is, in the color filter array, the color filters of R, G, and B (the R filter, the G filter, the B filter) are arranged with a certain cyclic nature.

In addition, when the basic array pattern P2 is divided into four of 3×3 pixels, it can be understood that the basic array pattern P2 includes an array in which a C array of 3×3 pixels that are enclosed by the frame of solid line and a D array 3×3 pixels that are enclosed by the frame of broken line are alternately arranged in the horizontal direction and the vertical direction.

In each of the C array and the D array, the G filters that are brightness system pixels are arranged at the four corners and the center, that is, arranged on the both diagonal lines. In addition, in the C array, the R filters are arranged in the right and lower directions and the B filters are arranged in the upper and left directions while sandwiching the G filter that is arranged at the center, and on the other hand, in the D array, the B filters are arranged in the right and lower directions and the R filters are arranged in the upper and left directions while sandwiching the G filter that is arranged at the center. That is, in the C array and the D array, positional relationship between the R filter and the B filter is reversed, and the other arrangements are same.

(Feature (2))

In the color filter array illustrated in FIG. 11, the G filters that correspond to a color that contributes most to obtaining a brightness signal (color of G in the embodiment) are arranged in each line of the horizontal, vertical, and diagonal (NE and NW) directions of the color filter array.

(Feature (3))

In the basic array pattern P2 of the color filter array illustrated in FIG. 11, the number of pixels of the R pixel, the G pixel, and the B pixel that correspond to the R filter, the G filter, and the B filter are 8 pixels, 20 pixels, and 8 pixels, respectively. That is, a proportion of the number of R pixels, the number of G pixels, and the number of B pixels is 2:5:2, and a ratio of the number of G pixels that help most to obtain a brightness signal is greater than each ratio of the number of R pixels and the number of B pixels that correspond to the colors other than G.

(Feature (4))

In the color filter array illustrated in FIG. 11, the one or more R filters and the one or more B filters that correspond to the other two or more colors other than the above-described color of G (colors of R and B in the embodiment) are arranged in each line of the horizontal, and vertical directions of the color filter array in the basic array pattern P2.

(Feature (5))

The color filter array illustrated in FIG. 11 includes a square array that corresponds to the 2×2 pixels that are constituted by the G filters. That is, in the basic array pattern P2, because the G pixels are arranged at the four corners, when the two basic array patterns P2 are arranged in the horizontal direction and the vertical direction, that is, four patterns in total, the square array that corresponds to the 2×2 pixels that are constituted by the G filters appears at the center.

In addition, when 5×5 pixels (local area of the mosaic image) are extracted using the C array or the D array as the center, the G pixels of 2×2 pixels exist at each of the four corners of the 5×5 pixels.

(Feature (6))

The C array and the D array that are illustrated in FIG. 11 are line symmetrical with respect to lines of the lower right diagonal direction (NW) that pass through the centers of the C array and the D array (center of the G filter that is arranged at the center).

Note that, in the embodiment, in the C array, the B filters are arranged at the upper side and left side of the G filter that is arranged at the center, and the R filters are arranged at the right side and lower side of the G filter, however, the B filters may be arranged at the upper side and right side of the G filter that is arranged at the center, and the R filters may be arranged at the left side and lower side of the G filter. In this case, the C array is line symmetrical with respect to the line of the upper right diagonal direction (NE) that passes through the center of the C array. The same arrangement is applied to that of the D array, and the description is omitted.

Fifth Embodiment

Figures 12, 13:
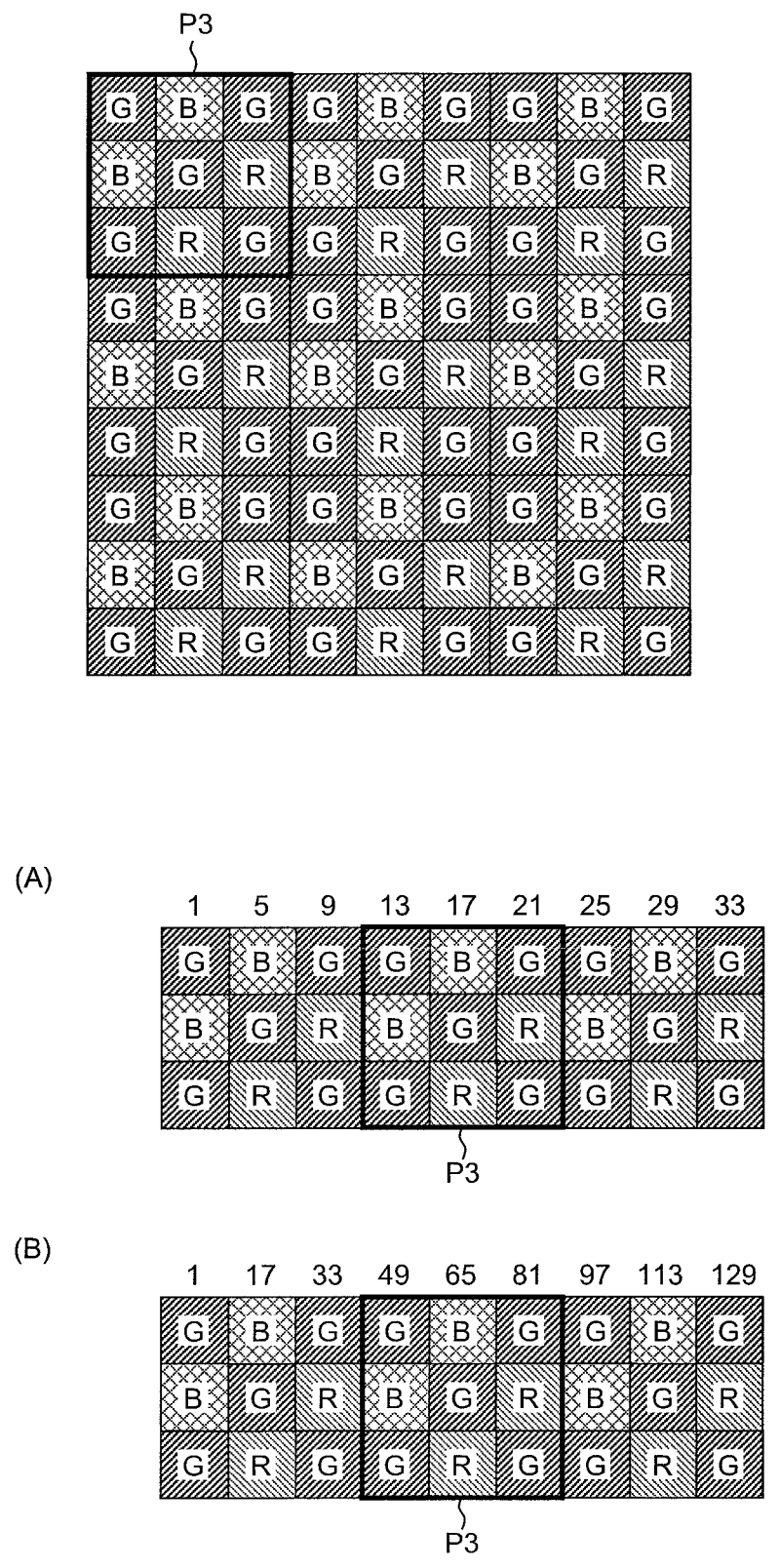

FIG. 12 is a diagram illustrating a fifth embodiment of the single-panel type color imaging device according to the present invention, in particular, a color filter array of color filters that are provided in the color imaging device.

The color filter array of the color imaging device of the fifth embodiment includes the same features as the features (1), (2), (3), (5), and (6) of the color filter array of the color imaging device of the first embodiment and features (8) and (9) that are not included in the color filter array of the color imaging device of the first embodiment. Note that the detailed description of the same portions as that of the first embodiment and the fourth embodiment is omitted.

(Feature (1))

The color filter array illustrated in FIG. 12 includes a basic array pattern P3 (pattern that is indicated by the thick frame) that is constituted by a square array pattern that corresponds to 3×3 pixels, and in the color filter array, the basic array pattern P3 is repeatedly arranged in the horizontal direction and the vertical direction. That is, in the color filter array, the color filters of R, G, and B (the R filter, the G filter, the B filter) are arranged with a certain cyclic nature.

In the basic array pattern P3, the G filters that are brightness system pixels are arranged at the four corners and the center, that is, arranged on the both diagonal lines. In addition, in the basic array pattern P3, the R filters are arranged in the right and lower directions and the B filters are arranged in the upper and left directions while sandwiching the G filter that is arranged at the center. That is, the arrangement of the basic array pattern P3 is the same as the arrangement of the C array in the fourth embodiment.

(Feature (2))

In the color filter array illustrated in FIG. 12, the G filters that correspond to a color that contributes most to obtaining a brightness signal (color of G in the embodiment) are arranged in each line of the horizontal, vertical, and diagonal (NE and NW) directions of the color filter array.

(Feature (3))

In the basic array pattern of the color filter array illustrated in FIG. 12, the number of pixels of the R pixel, the G pixel, and the B pixel that correspond to the R filter, the G filter, and the B filter are 2 pixels, 5 pixels, and 2 pixels, respectively. That is, a proportion of the number of R pixels, the number of G pixels, and the number of B pixels is 2:5:2, and a ratio of the number of G pixels that help most to obtain a brightness signal is greater than each ratio of the number of R pixels and the number of B pixels that correspond to the colors other than G.

(Feature (5))

The color filter array illustrated in FIG. 12 includes a square array that corresponds to 2×2 pixels that are constituted by the G filters. That is, in the basic array pattern P3, because the G pixels are arranged at the four corners, when the two basic array patterns P3 are arranged in the horizontal direction and the vertical direction, that is, the four patterns in total, the square array that corresponds to the 2×2 pixels that are constituted by the G filters appears at the center. In addition, when 5×5 pixels (local area of the mosaic image) are extracted using the basic array pattern P3 as the center, the G pixels of 2×2 pixels exist at each of the four corners of the 5×5 pixels.

(Feature (6))

The basic array pattern P3 of the color filter array illustrated in FIG. 12 is line symmetrical with respect to a line of the upper right diagonal direction (NE) that passes through the center of the basic array pattern P3 (center of the G filter that is arranged at the center).

(Feature (8))

In the color filter array illustrated in FIG. 12, a color filter array that is obtained by down-sampling the color filter array to $1/4^n$ (n: natural number) in the horizontal direction or the vertical direction is substantially the same as the original color filter array. That is, a color filter array that is obtained by reading out a line every $1/4^n$ (n is a natural number) lines in the horizontal direction or the vertical direction is substantially the same as the original color filter array.

FIG. 13 illustrates a color filter array that is obtained by down-sampling and reading out the color filter array illustrated in FIG. 12 in the horizontal direction, (A) portion of FIG. 13 illustrates the result of ¼ down-sampling, and (B) portion of FIG. 13 illustrates the result of 1/16 (¼²) down-sampling. Numbers that are assigned in FIG. 13 respectively indicate rows that are extracted when numbers such as the first, second, third, . . . rows are assigned from the upper left of the color filter array illustrated in FIG. 12 in the horizontal direction. Note that, in FIG. 13, for explanation, the only first to third lines of the color filter array illustrated in FIG. 12 are displayed.

In the color filter array illustrated in (A) portion of FIG. 13, which is down-sampled to ¼, the 13th, 17th, and 21st rows and the first to third lines are included in the basic array pattern P3, and the basic array pattern P3 repeatedly appears in the horizontal direction and the vertical direction. That is, the color filter array that is down-sampled to ¼ is the same as the original color filter array.

In the color filter array illustrated in (B) portion of FIG. 13, which is down-sampled to ⅛, the 49th, 65th, and 81st rows and the first to third lines are included in the basic array pattern P3, the basic array pattern P3 repeatedly appears in the horizontal direction and the vertical direction. That is, the color filter array that is down-sampled to 1/16 is the same as the original color filter array.

Figure 14:
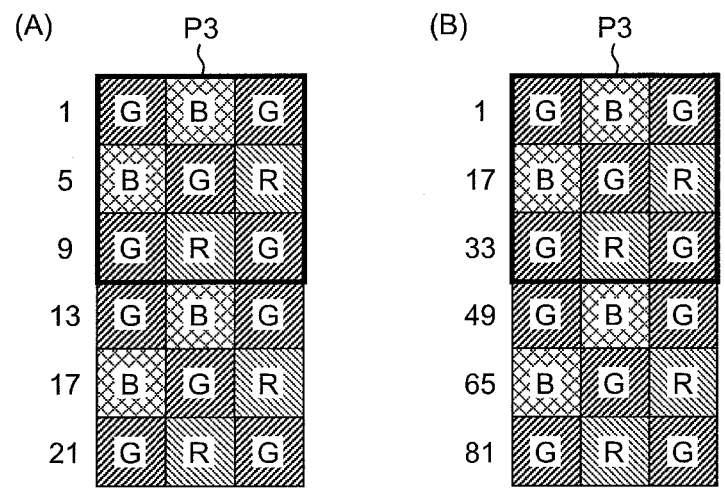
FIG. 14 is a diagram illustrating the color filter array of the color imaging device of the fifth embodiment, which is down-sampled to ¼″ in the vertical direction, (A) portion of FIG. 14 illustrates a case in which the color filter array is down-sampled to ¼, and (B) portion of FIG. 14 illustrates a case in which the color filter array is down-sampled to 1/16.

FIG. 14 illustrates a color filter array that is obtained by down-sampling the color filter array illustrated in FIG. 12 in the vertical direction, (A) portion of FIG. 14 illustrates the result of ¼ down-sampling, and (B) portion of FIG. 14 illustrates the result of 1/16 (¼²) down-sampling. Numbers that are assigned in FIG. 14 respectively indicate lines that are extracted when numbers such as the first, second, third, . . . lines are assigned from the upper left of the color filter array illustrated in FIG. 12 in the vertical direction. Note that, in FIG. 14, for explanation, the only first to third rows of the color filter array illustrated in FIG. 12 are displayed.

In the color filter array illustrated in (A) portion of FIG. 14, which is down-sampled to ¼, the first, fifth, and ninth lines and the first to third rows are included in the basic array pattern P3, and the basic array pattern P3 repeatedly appears in the horizontal direction and the vertical direction. That is, the color filter array that is down-sampled to ¼ is the same as the original color filter array.

In the color filter array illustrated in (B) portion of FIG. 14, which is down-sampled to 1/16, the first, 17th, and 33rd lines and the first to third rows are included in the basic array pattern P3, the basic array pattern P3 repeatedly appears in the horizontal direction and the vertical direction. That is, the color filter array that is down-sampled to 1/16 is the same as the original color filter array.

When the original color filter array and a color filter array that is obtained by down-sampling the color filter array to $1/4^n$ are substantially the same, so that the imaging processing at the time of capturing a still image and the imaging processing at the time of capturing a moving image can be set as common processing.

(Feature (9))

In the color filter array illustrated in FIG. 12, an array of the G filter in a color filter array that is obtained by down-sampling the color filter array to $1/2^n$ in the horizontal direction or the vertical direction is substantially the same as an array of the G filter in the original color filter array.

Figure 15:
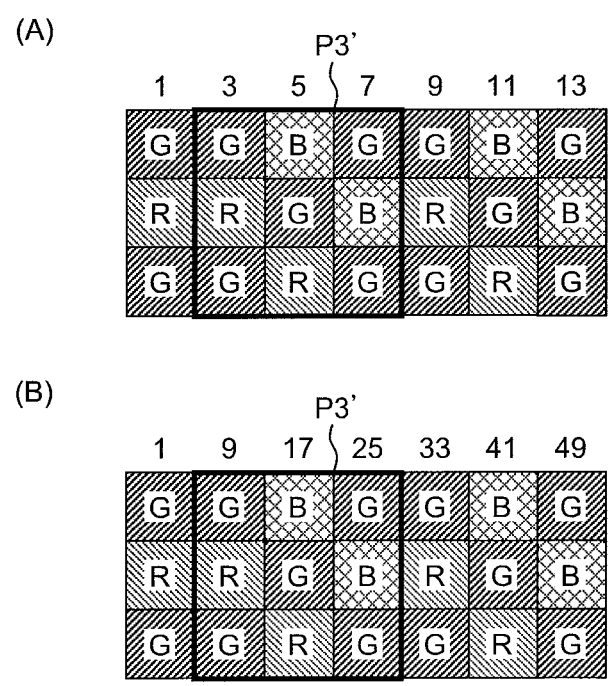
FIG. 15 is a diagram illustrating the color filter array of the color imaging device of the fifth embodiment, which is down-sampled to ½″ in the horizontal direction, (A) portion of FIG. 15 illustrates a case in which the color filter array is down-sampled to ½, and (B) portion of FIG. 15 illustrates a case in which the color filter array is down-sampled to ⅛.

FIG. 15 illustrates a color filter array that is obtained by down-sampling and reading out the color filter array illustrated in FIG. 12 in the horizontal direction, (A) portion of FIG. 15 illustrates the result of ½ down-sampling, and (B) portion of FIG. 15 illustrates the result of ⅛ (½³) down-sampling. Numbers that are assigned in FIG. 15 respectively indicate rows that are extracted when numbers such as the first, second, third, . . . rows are assigned from the upper left of the color filter array illustrated in FIG. 12 in the horizontal direction. Note that, in FIG. 15, for explanation, the only first to third lines of the color filter array illustrated in FIG. 12 are displayed.

Figure 16:
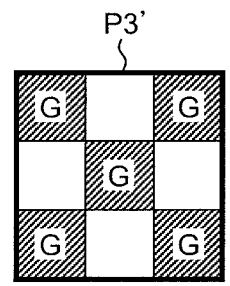
FIG. 16 is a diagram illustrating an array pattern of a G filter.

In the color filter array illustrated in (A) portion of FIG. 15, which is down-sampled to ½, an array of the G filters of the third, fifth, and seventh rows and the first to third lines is included in an array pattern P3'. As illustrated in FIG. 16, the array pattern P3' is an array that is constituted only by the G filters, and in the array pattern P3', the G filters are arranged at the four corners and the center, that is, arranged on the both diagonal lines. Such arrangement is the same as the arrangement of the G filters of the basic array pattern P3. The array pattern P3' repeatedly appears in the horizontal direction and the vertical direction. That is, the array of the G filters in the color filter array that is down-sampled to ½ is the same as the original color filter array except for the first row.

In the color filter array illustrated in (B) portion of FIG. 15, which is down-sampled to ⅛, an array of the G filters of the ninth, 17th, and 25th rows and the first to third lines is included in the array pattern P3', and the array pattern P3' repeatedly appears in the horizontal direction and the vertical direction. That is, the array of the G filters in the color filter array that is down-sampled to ⅛ is the same as the array of the G filters in the original color filter array except for the first row.

Figure 17:
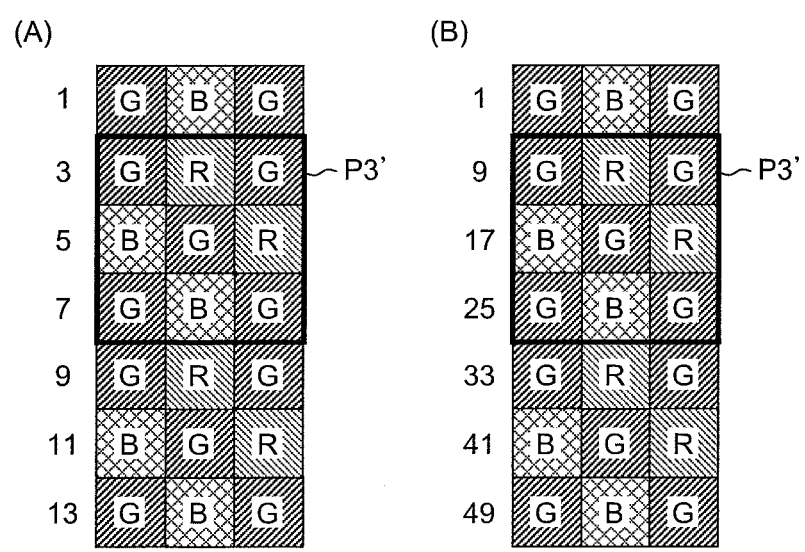
FIG. 17 is a diagram illustrating the color filter array of the color imaging device of the fifth embodiment, which is down-sampled to ½″ in the vertical direction, (A) portion of FIG. 17 illustrates a case in which the color filter array is down-sampled to ½, and (B) portion of FIG. 17 illustrates a case in which the color filter array is down-sampled to ⅛.

FIG. 17 illustrate a color filter array that is obtained by down-sampling and reading out the color filter array illustrated in FIG. 12 in the vertical direction, (A) portion of FIG. 17 illustrates the result of ½ down-sampling, and (B) portion of FIG. 17 illustrates the result of ⅛ (½³) down-sampling. Numbers that are assigned in FIG. 17 respectively indicate rows that are extracted when numbers such as the first, second, third, . . . rows are assigned from the upper left of the color filter array illustrated in FIG. 12 in the vertical direction. Note that, in FIG. 17, for explanation, the only first to third lines of the color filter array illustrated in FIG. 12 are displayed.

In the color filter array illustrated in (A) portion of FIG. 17, which is down-sampled to ½, the G filters of the third, fifth, and seventh lines and the first to third rows are included in the array pattern P3', and the array pattern P3' repeatedly appears in the horizontal direction and the vertical direction. That is, an array of the G filters in the color filter array that is down-sampled to ½ is the same as the array of the G filters in the original color filter array except for the first line.

In the color filter array illustrated in (B) portion of FIG. 17, which is down-sampled to ⅛, the G filters of the ninth, 17th, and 25th lines and the first to third rows are included in the array pattern P3', and the array pattern P3' repeatedly appears in the horizontal direction and the vertical direction. That is, an array of the G filters in the color filter array that is down-sampled to ⅛ is the same as the array of the G filters in the original color filter array except for the first line.

As described above, the G filters are configured so that the array of the G filters in the original color filter array and the array of the G filters in a color filter array that is obtained by down-sampling the color filter array to ½$^n$ are substantially the same. That is, before and after ½$^n$ down-sampling, positional relationship of the G filters that are brightness system pixels and the other color filters (the R filter and the B filter) is the same. As described above, load of the imaging processing can be reduced due to the same arrangement of the G pixels, which are the main object of the imaging processing.

Note that, in FIG. 15 and FIG. 17, the only ½ down-sampling and ⅛ (½³) down-sampling are illustrated, and as illustrated in FIG. 13 and FIG. 14, the original color filter array and the color filter array that is obtained by down-sampling the color filter array to ¼$^n$ (½²) are substantially the same, so that the array of the G filters in the original color filter array and the array of the G filters in the color filter array that is obtained by down-sampling the color filter array to ½$^n$ are substantially the same as a matter of course.

Note that, in the embodiment, the basic array pattern P3 (the C array in the fourth embodiment) is used in which the G filters are arranged on the diagonal line, and the R filters are arranged in the right and lower directions and the B filters are arranged in the upper and left directions while sandwiching the G filter that is arranged at the center, however, even when the same pattern as the basic array pattern is used in which the positional relationship of the R filter and the B filter is reversed, that is, the D array of the fourth embodiment in which the B filters are arranged in the right and lower directions and the R filters are arranged in the upper and left directions while sandwiching the G filter that is arranged at the center, is used, a color filter having the same feature can be obtained.

Sixth Embodiment

Figure 18:
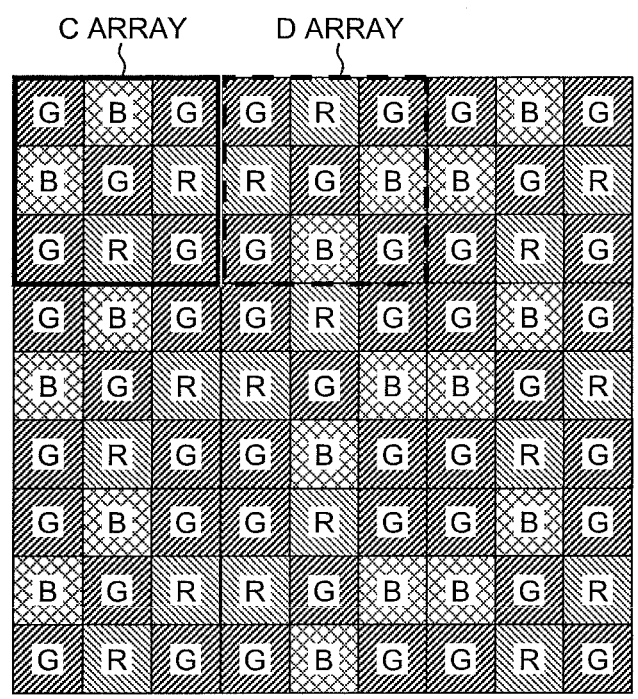
FIG. 18 is a diagram illustrating a sixth embodiment of the single-panel type color imaging device according to the present invention.
Figure 22:
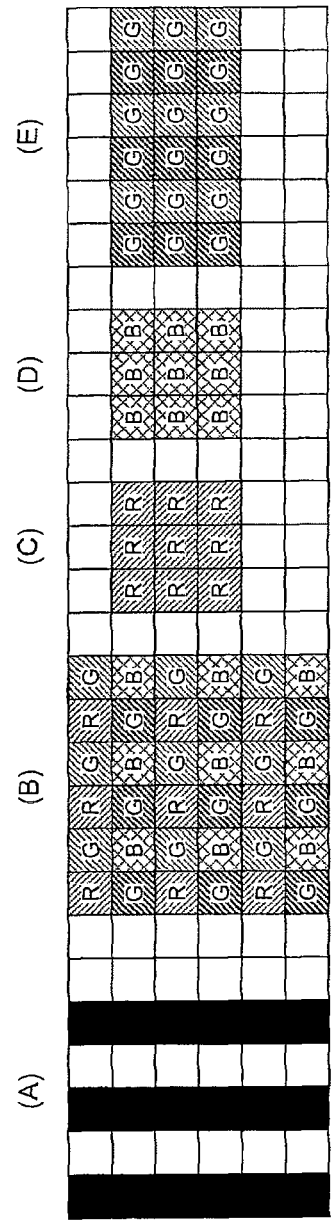
FIG. 22 is a diagram used to explain a problem with a color imaging device including a color filter of a conventional Bayer array.
Figure 23:
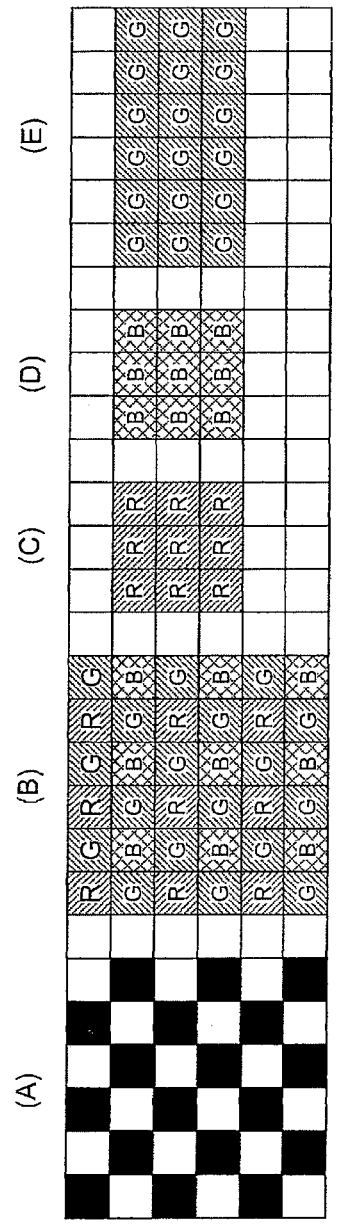
FIG. 23 is another diagram used to explain the problem with the color imaging device of the color filter of the conventional Bayer array.

FIG. 18 is a diagram illustrating a sixth embodiment of the single-panel type color imaging device according to the present invention, in particular, a color filter array of color filters that are provided in the color imaging device.

The color filter array of the color imaging device of the sixth embodiment includes the same features as the features (1), (2), (3), (5), and (6) of the color filter array of the color imaging device of the first embodiment and the features (8) and (9) of the color filter array of the color imaging device of the fifth embodiment. Note that the detailed description of the same portions as the first embodiment and the fifth embodiment is omitted.

(Feature (1))

In the color filter array illustrated in FIG. 18, a basic array pattern that is constituted by a square array pattern that corresponds to 3×6 pixels is repeatedly arranged in the horizontal direction and the vertical direction. In the basic array pattern, the G filters that are brightness system pixels are arranged at the four corners and the center, that is, arranged on the both diagonal lines.

The basic array pattern includes a C array in which the R filters are arranged in the right and lower directions and the B filters are arranged in the upper and left directions while sandwiching the G filter that is arranged at the center, and a D array in which the B filters are arranged in the right and lower directions and the R filters are arranged in the upper and left directions while sandwiching the G filter that is arranged at the center. The C array and the D array are the same arrays as the C array and the D array in the fourth embodiment.

The D array is arranged on the right side of the C array, and the C array is arranged on the right side of the D array. In addition, the arrays are repeatedly arranged in the vertical direction. That is, in the color filter array, the color filters of R, G, and B (the R filter, the G filter, and the B filter) are arranged with a certain cyclic nature (the G filter in 3×3 and the R filter and the B filter in 3×6). (Feature (2))

In the color filter array illustrated in FIG. 18, the G filters that correspond to a color that contributes most to obtaining a brightness signal (color of G in the embodiment) are arranged in the each line of the horizontal, vertical, and diagonal (NE and NW) directions of the color filter array.

(Feature (3))

In the basic array pattern (the C array and the D array) of the color filter array illustrated in FIG. 18, the number of pixels of the R pixel, the G pixel, and the B pixel that correspond to the R filter, the G filter, and the B filter are 4 pixels, 10 pixels, and 4 pixels, respectively. That is, a proportion of the number of R pixels, the number of G pixels, and the number of B pixels is 2:5:2, a ratio of the number of G pixels that help most to obtain a brightness signal is greater than each ratio of the number of R pixels and the number of B pixels that correspond to the colors other than G.

(Feature (5))

The color filter array illustrated in FIG. 18 includes a square array that corresponds to 2×2 pixels that are constituted by the G filters. That is, in the basic array pattern (the C array or the D array), because the G pixels are arranged at the four corners, when the two basic array patterns (the C array or the D array) are arranged in the horizontal direction and the vertical direction, that is, the four patterns in total, the square array that corresponds to the 2×2 pixels that are constituted by the G filters appears at the center. In addition, when 5×5 pixels (local area of the mosaic image) are extracted using the C array or the D array as the center, the G pixels of 2×2 pixels exist at each of the four corners of the 5×5 pixels.

(Feature (6))

The C array and the D array of the color filter array illustrated in FIG. 18 are line symmetrical with respect to the line of the upper right diagonal direction (NE) that passes though the centers of the C array and the D array (center of the G filter that is arranged at the center), respectively.

(Feature (8))

In the color filter array illustrated in FIG. 18, a color filter array that is obtained by down-sampling the color filter array in the vertical direction to $1/4^n$ is substantially the same as the original color filter array.

Figure 19:
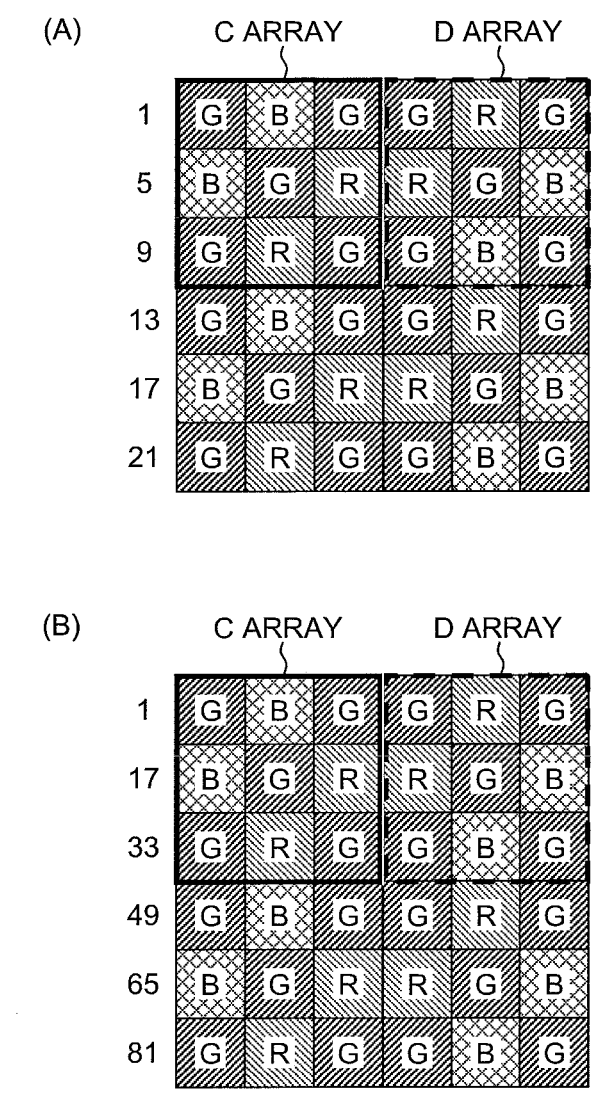

FIG. 19 illustrates a color filter array that is obtained by down-sampling and reading out the color filter array illustrated in FIG. 18 in the vertical direction, (A) portion of FIG. 19 illustrates the result of 1/4 down-sampling, and (B) portion of FIG. 19 illustrates the result of 1/16 ($1/4^2$) down-sampling. Numbers that are assigned in FIG. 19 respectively indicate lines that are extracted when numbers such as the first, second, third, . . . lines are assigned from the upper left of the color filter array illustrated in FIG. 16 in the vertical direction. Note that, in FIG. 19, for explanation, the only first to 6 rows of the color filter array illustrated in FIG. 18 are displayed.

In the color filter array illustrated in (A) portion of FIG. 19, which is down-sampled to 1/4, the first, fifth, and ninth lines and the first to third rows are included in the C array, and the C array repeatedly appears in the vertical direction. In addition, the first, fifth, ninth lines and the fourth to sixth rows are included in the D array, and the D array repeatedly appears in the vertical direction. That is, the color filter array that is down-sampled to 1/4 is the same as the original color filter array.

In the color filter array illustrated in (B) portion of FIG. 19, which is down-sampled to 1/16, the first, 17th, and 33rd lines and the first to third rows are included in the C array, the C array repeatedly appears in the vertical direction. In addition, the first, 17th, and 33rd lines and the fourth to sixth rows are included in the D array, the D array repeatedly appears in the vertical direction. That is, the color filter array that is down-sampled to 1/16 is the same as the original color filter array.

(Feature (9))

In the color filter array illustrated in FIG. 18, an array of the G filters in a color filter array that is obtained by down-sampling the color filter array to $1/2^n$ in the vertical direction is substantially the same as an array of the original G filters.

Figure 20:
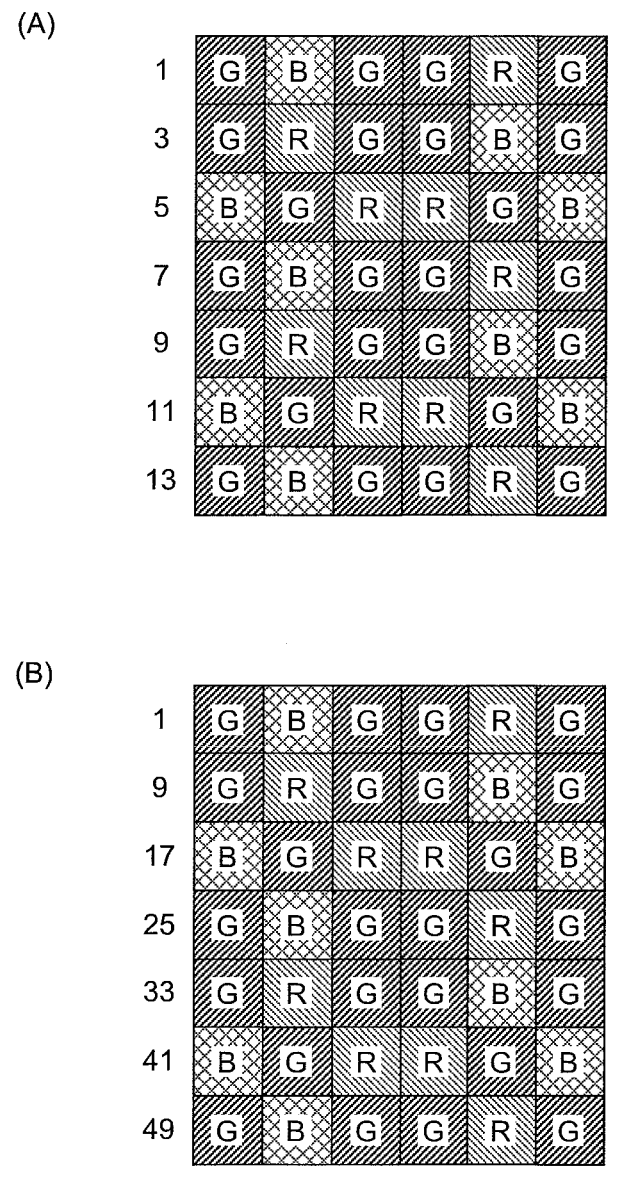

FIG. 20 illustrates a color filter array that is obtained by down-sampling and reading out the color filter array illustrated in FIG. 18 in the vertical direction, (A) portion of FIG. 20 illustrates the result of 1/2 down-sampling, and (B) portion of FIG. 20 illustrates the result of 1/8 ($1/2^3$) down-sampling. Numbers that are assigned in FIG. 20 respectively indicate rows that are extracted when numbers such as the first, second, third, . . . rows are assigned from the upper left of the color filter array illustrated in FIG. 18 in the vertical direction. Note that, in FIG. 20, for explanation, the only first to sixth lines of the color filter array illustrated in FIG. 18 are displayed.

In the color filter array illustrated in (A) portion of FIG. 20, which is down-sampled to 1/2, between a color filter array of the third, fifth, and seventh lines and the first to third rows and a color filter array of the third, fifth, and seventh lines and the fourth to sixth rows, the arrays of the R filter and the B filter are different and the arrays of the G filter are the array patterns P3' in common. In addition, the array pattern P3' repeatedly appears in the horizontal direction and the vertical direction. That is, the array of the G filters in the color filter array that is down-sampled to 1/2 is the same as the array of the G filters in the original color filter array except for the first line.

In the color filter array illustrated in (B) portion of FIG. 20, which is down-sampled to 1/8, between a color filter array of the ninth, 17th, and 25th lines and the first to third rows and a color filter array of the ninth, 17th, and 25th lines and the fourth to sixth rows, the arrays of the R filter and the B filter are different, and the arrays of the G filter are the array pattern P3' in common. In addition, the array pattern P3' repeatedly appears in the horizontal direction and the vertical direction. That is, the color filter array that is down-sampled to 1/8 is the same as the array of the G filters in the original color filter array except for the first line.

Note that the only 1/2 down-sampling and the 1/8 ($1/2^3$) down-sampling are illustrated in FIG. 20, however, as illustrated in FIG. 19, the original color filter array and the color filter array that is obtained by down-sampling the color filter array to $1/4^n$ ($1/2^2$) are substantially the same, and an array of the G filters in the original color filter array and an array of G filters in the color filter array that is obtained by down-sampling the color filter array to $1/2^n$ are substantially the same, as a matter of course.

Note that, in the embodiment, the C array and the D array are arranged in the horizontal direction, and the arrays are repeatedly arranged in the vertical direction, however, a color filter having the same feature can be obtained even when the C array and the D array are arranged in the vertical direction, and the arrays are repeatedly arranged in the horizontal direction. However, in the features (8) and (9), the horizontal direction and the vertical direction are switched.

Seventh Embodiment

Figure 21:
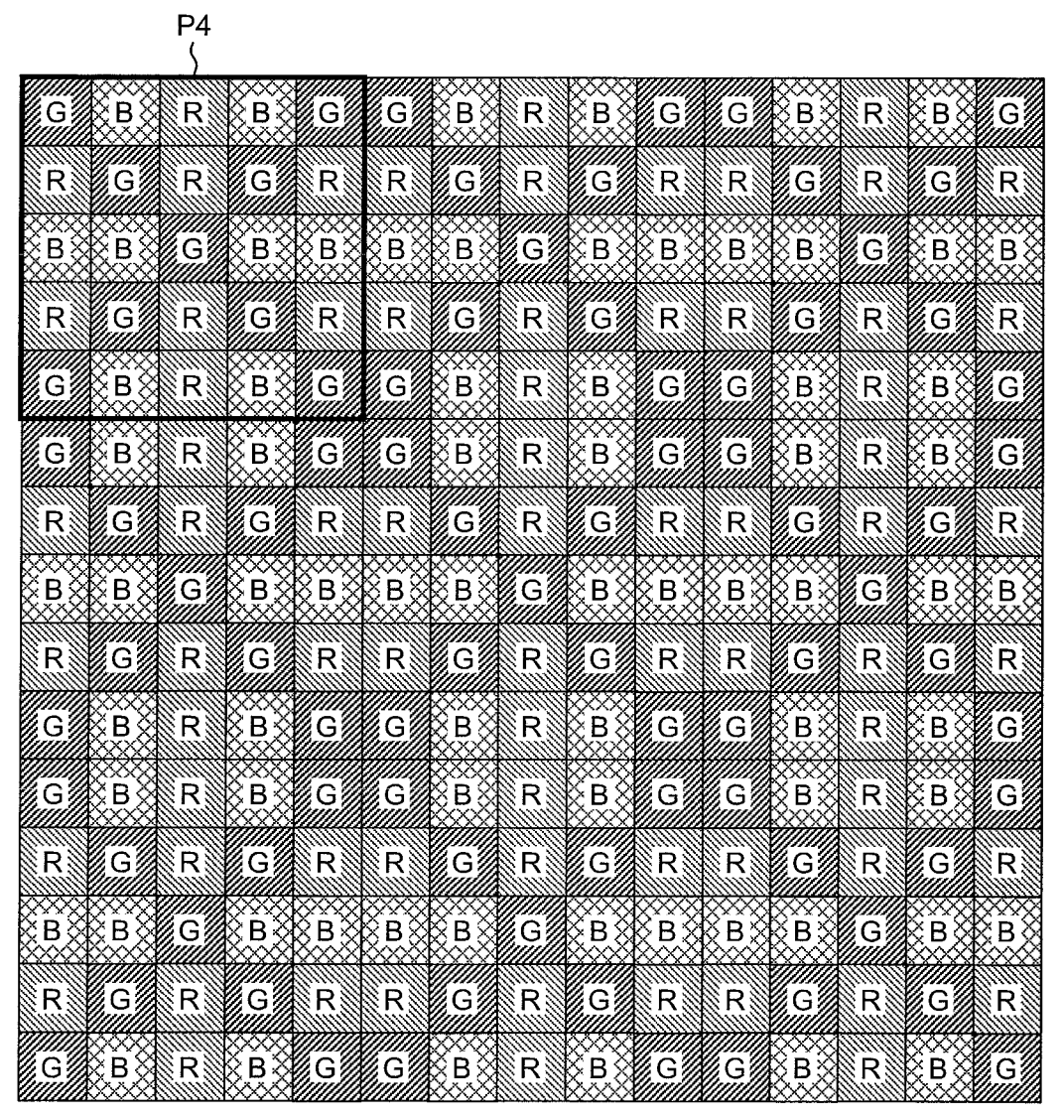

FIG. 21 illustrates a seventh embodiment of the single-panel type color imaging device according to the present invention, in particular, a color filter array of color filters that are provided in the color imaging device.

The color filter array of the color imaging device of the seventh embodiment includes the same features as the features (1), (2), (3), (5), and (6) of the color filter array of the color imaging device of the first embodiment. Note that the detailed description of the same portions as the first embodiment is omitted.

(Feature (1))

The color filter array illustrated in FIG. 21 includes a basic array pattern P4 (pattern that is indicated by the thick frame) that is constituted by a square array pattern that corresponds to 5×5 pixels, and the basic array pattern P4 is repeatedly arranged in the horizontal direction and the vertical direction. That is, in the color filter array, the color filters of R, G, and B (the R filter, the G filter, and the B filter) are arranged with a certain cyclic nature.

In the basic array pattern P4, the G filters that are brightness system pixels are arranged on the both diagonal lines. The R filters are arranged in the vertical direction and the G filters are arranged in the horizontal direction while sandwiching the G filter that is arranged at the center. In addition, in the basic array pattern P4, the R filter, the G filter, and the B filter are arranged so as not to be adjacent to each other. That is, the R filters are arranged on the upper and lower sides of each of the B filters that are arranged at the center of the left and right ends, and the B filters are arranged on the right and left sides of each of the R filter that are arranged at the center of the upper and lower ends.

(Feature (2))

In the color filter array illustrated in FIG. 21, the G filters that correspond to a color that contributes most to obtaining a brightness signal (color of G in the embodiment) are arranged in the each line of the horizontal, vertical, and diagonal (NE and NW) directions of the color filter array.

(Feature (3))

In basic array pattern of the color filter array illustrated in FIG. 21, the number of pixels of the R pixel, the G pixel, and the B pixel that correspond to the R filter, the G filter, and the B filter are 8 pixels, 9 pixels, and 8 pixels, respectively. That is, a ratio of the number of G pixels that help most to obtain a brightness signal is greater than each ratio of the number of R pixels and the number of B pixels that correspond to the colors other than G.

(Feature (5))

The color filter array illustrated in FIG. 21 includes a square array that corresponds to 2×2 pixels that are constituted by the G filters. That is, in the basic array pattern P4, because the G pixels are arranged at the four corners, when the two basic array pattern P4s are arranged in the horizontal direction and the vertical direction, that is four patterns in total, the square array that corresponds to the 2×2 pixels that are constituted by the G filters appears at the center.

In addition, when 7×7 pixels (local area of the mosaic image) are extracted using the basic array pattern P4 as the center, G pixels of 2×2 pixels exist at each of the four corners of the 7×7 pixels.

(Feature (6))

The basic array pattern P4 illustrated in FIG. 21 is point symmetrical with respect to the center of the basic array pattern P4 (center of the G filter that is arranged at the center). In addition, the basic array pattern P4 is line symmetrical with respect to the lines of the horizontal and vertical directions that pass through the center of the basic array pattern P4 (center of the G filter that is arranged at the center).

The embodiment is an example of a color filter array including a basic array pattern of 5×5 pixels, and the basic array pattern of 5×5 pixels is not limited to the above-described case as long as the G filters are arranged on the diagonal lines. For example, a basic array pattern can be configured so that the R filter and the B filter of the outermost periphery of the basic array pattern P4 are switched, and the R filter, the G filter, and the B filter are not adjacent to each other in the vertical and horizontal directions. As a result, the basic array pattern can be configured in which the feature (4) of the first embodiment is satisfied in addition to the features that are satisfied when the basic array pattern P4 is used.

As described above, the present invention is described with reference to the embodiments, and the technical range of the present invention is not limited to the range that is described in the above-described embodiments. It is apparent for those skilled in the art that various modifications or improvements can be made to the above-described embodiments. In addition, it goes without saying that it can be appreciated that the present invention is not limited to the above-described embodiments, and various modifications can be made without departing from the scope and spirit of the present invention.

In addition, in the above-described embodiment, as a basic array pattern of N×N, 3×3 pixels, 5×5 pixels, and 6×6 pixels are mainly described, however, the basic array pattern included in the technical range of the present invention is not limited to the above-described cases. In the basic array pattern, N may be an odd number of 3 or more, for example, 7×7 pixels and 9×9 pixels may be employed. However, for ease in synchronization processing and the imaging processing such as the down-sampling processing at the time of capturing a moving image, it is desirable that N is 10 or less.

[Others]

In the above-described embodiments, the color filter array of the color filter of the three primary colors of R, G, and B is described, however, the type of the color filter is not limited to the above-described embodiments, and a color filter array of color filters of four colors in which another color (for example, emerald (E)) is added to the three primary colors of R, G, and B may be employed.

In addition, the present invention can be applied to a color filter array of color filters of a complementary color system of four colors in which G is added to C (cyan), M (magenta), and Y (yellow) that are complementary colors of the primary colors R, G, and B.

The invention claimed is:

1. A color imaging device that is a single-panel type color imaging device comprising:
a plurality of pixels that are constituted by photoelectric conversion devices that are arranged in a horizontal direction and a vertical direction; and
a color filter of a certain color filter array arranged on the plurality of pixels, wherein the color filter array includes a basic array pattern of N×N (N: odd number of 3 or more), in which a first filter that corresponds to a first color that contributes most to obtaining a brightness signal and second filters that correspond to two or more second colors other than the first color are arranged, and
the basic array pattern is continuously repeated in the horizontal direction and the vertical direction to form the color filter array, such that a plurality of the basic array patterns are arranged next to each other along the horizontal and vertical directions in the color filter array,
the first filter is arranged on two diagonal lines in the basic array pattern that is repeated in the horizontal direction and the vertical direction in the color filter array, and
in the basic array pattern, a ratio of the number of pixels of the first color that corresponds to the first filter is greater than each ratio of the number of pixels of the second colors that correspond to the second filters.

2. The color imaging device according to claim 1, wherein the basic array pattern includes 3×3 pixels.

3. The color imaging device according to claim 2, wherein the first filter and the second filters are arranged so that the color filter array and a color filter array that is obtained by down-sampling the color filter array to ½ⁿ (n: natural number) in the horizontal direction or the vertical direction are substantially identical.

4. The color imaging device according to claim 2, wherein the first filter and the second filters are arranged so that the color filter array and a color filter array that is obtained by down-sampling the color filter array to ¼ⁿ (n: natural number) in the horizontal direction or the vertical direction are substantially identical.

5. The color imaging device according to claim 4, wherein the first filters are arranged so that an array of the first filters in the color filter array and an array of the first filters in a color filter array that is obtained by down-sampling the color filter array to ½ⁿ (n: natural number) in the horizontal direction or the vertical direction are substantially identical.

6. The color imaging device according to claim 1, wherein the one or more first filters are arranged in each line of horizontal, vertical, upper right diagonal, and lower right diagonal directions of the color filter array.

7. The color imaging device according to claim 1, wherein the color filter array includes a square array that corresponds to 2×2 pixels that are constituted by the first filter.

8. The color imaging device according to claim 1, wherein the color filter array in the certain basic array pattern is point symmetrical with respect to a center of the basic array pattern.

9. The color imaging device according to claim 1, wherein the color filter array in the certain basic array pattern is line symmetrical with respect to at least one of the lines of the horizontal, vertical, upper right diagonal, and lower right diagonal directions that pass through the center of the basic array pattern.

10. The color imaging device according to claim 1, wherein the first color is a green (G) color, and the second colors are a red (R) color and a blue (B) color.

11. The color imaging device according to claim 10, wherein the color filter includes an R filter, a G filter, and a B filter that respectively correspond to the red (R) color, the green (G) color, and the blue (B) color, and the basic array pattern is a square array pattern that corresponds to 3×3 pixels, and in the basic array pattern, the G filters are arranged at the center and the four corners, and the B filters or the R filters are arranged in the vertical direction and filters of the B filters or the R filters that are not arranged in the vertical direction are arranged in the horizontal direction while sandwiching the G filter that is arranged at the center.

12. The color imaging device according to claim 10, wherein the color filter includes an R filter, a G filter, and a B filter that respectively correspond to the red (R) color, the green (G) color, and the blue (B) color, and the basic array pattern is a square array pattern that corresponds to 3×3 pixels, and in the basic array pattern, the G filters are arranged at the center and the four corners, the B filters or the R filters are arranged at an upper middle, and a middle left or a middle right, and filters of the B filters or the R filters that are not arranged at the upper middle are arranged in the other frames.

* * * * *